(12) United States Patent
Uhrich et al.

(10) Patent No.: US 8,607,544 B2
(45) Date of Patent: Dec. 17, 2013

(54) METHODS AND SYSTEMS FOR VARIABLE DISPLACEMENT ENGINE CONTROL

(75) Inventors: Michael James Uhrich, West Bloomfield, MI (US); Adam Nathan Banker, Plymouth, MI (US); James Michael Kerns, Trenton, MI (US); Stephen B. Smith, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 14 days.

(21) Appl. No.: 13/106,138

(22) Filed: May 12, 2011

(65) Prior Publication Data

US 2011/0265453 A1    Nov. 3, 2011

(51) Int. Cl.
- *F01N 3/00* (2006.01)
- *F02D 7/00* (2006.01)
- *F02D 13/06* (2006.01)
- *F02D 17/02* (2006.01)

(52) U.S. Cl.
USPC ............. 60/285; 60/274; 60/276; 60/295; 123/198 F; 123/481

(58) Field of Classification Search
USPC .......... 60/274, 285, 287, 288, 295, 297, 276, 60/299; 123/198 F, 481
See application file for complete search history.

(56) References Cited

U.S. PATENT DOCUMENTS

| | | | |
|---|---|---|---|
| 5,238,658 A | 8/1993 | Makioka et al. | |
| 5,331,809 A | 7/1994 | Takeshima et al. | |
| 5,562,086 A | 10/1996 | Asada et al. | |
| 5,582,004 A | 12/1996 | Rutschmann | |
| 6,164,065 A | 12/2000 | Denari et al. | |
| 6,182,446 B1 | 2/2001 | Gunther et al. | |
| 6,269,793 B1 | 8/2001 | Russ et al. | |
| 6,408,618 B2 | 6/2002 | Ide | |
| 6,647,947 B2 | 11/2003 | Boyer et al. | |
| 6,655,132 B2 * | 12/2003 | Bouchez et al. | 60/295 |
| 6,763,297 B1 | 7/2004 | Stahl et al. | |
| 6,857,264 B2 * | 2/2005 | Ament | 60/284 |
| 6,874,313 B2 | 4/2005 | Yurgil et al. | |
| 6,886,329 B2 | 5/2005 | Ueda et al. | |
| 7,044,885 B2 | 5/2006 | Doering | |
| 7,086,386 B2 | 8/2006 | Doering | |
| 7,299,623 B2 * | 11/2007 | Stanglmaier et al. | 60/274 |
| 7,591,758 B2 | 9/2009 | Bidner et al. | |

(Continued)

OTHER PUBLICATIONS

Smith, Stephen B. et al., "Methods and Systems for Variable Displacement Engine Control," U.S. Appl. No. 13/106,181, filed May 12, 2011, 65 pages.

(Continued)

*Primary Examiner* — Thomas Denion
*Assistant Examiner* — Diem Tran
(74) *Attorney, Agent, or Firm* — Julia Voutyras; Alleman Hall McCoy Russell & Tuttle LLP

(57) ABSTRACT

Methods and systems are provided for selecting a group of cylinders for selective deactivation, in a variable displacement engine system, based at least on a regeneration state of an exhaust catalyst. The position of one or more valves and throttles may be adjusted based on the selective deactivation to reduce back-flow through the disabled cylinders while also maintaining conditions of a downstream exhaust catalyst. Pre-ignition and knock detection windows and thresholds may also be adjusted based on the deactivation to improve the efficiency of knock and pre-ignition detection.

20 Claims, 10 Drawing Sheets

(56) References Cited

U.S. PATENT DOCUMENTS

| | | |
|---|---|---|
| 7,600,503 B2 | 10/2009 | Russell |
| 7,647,766 B2 | 1/2010 | Surnilla et al. |
| 7,651,441 B2 | 1/2010 | Maguire et al. |
| 7,818,999 B2 | 10/2010 | Schnaibel et al. |
| 2007/0074513 A1 | 4/2007 | Lamb et al. |
| 2007/0199305 A1 | 8/2007 | Hoshi |
| 2009/0000576 A1 | 1/2009 | Maehara et al. |

OTHER PUBLICATIONS

Banker, Adam Nathan et al., "Methods and Systems for Variable Displacement Engine Control," U.S. Appl. No. 13/106,213, filed May 12, 2011, 63 pages.

Kerns, James Michael et al., "Methods and Systems for Variable Displacement Engines Control," U.S. Appl. No. 13/106,259, filed May 12, 2011, 64 pages.

\* cited by examiner

METHODS AND SYSTEMS FOR VARIABLE DISPLACEMENT ENGINE CONTROL

FIELD

The present application relates to methods and systems for controlling a variable displacement engine (VDE).

BACKGROUND AND SUMMARY

Engine exhaust catalysts require periodic regeneration to restore catalytic activity and reduce catalyst oxidation. For example, catalysts may be regenerated by rich injecting fuel to reduce the amount of oxygen stored at the catalyst. Catalyst regeneration strategies may vary for different engine systems.

One example approach for exhaust catalyst regeneration in a variable displacement engine (VDE) system is described by Doering et al. in U.S. Pat. No. 7,044,885. Therein, the engine includes two cylinder groups, each coupled to respective catalysts. An engine control system is configured to alternate the cylinder group that is selectively disabled during a VDE mode of operation to balance engine wear and catalyst usage.

However, the inventors herein have identified a potential issue with such an approach. If the catalyst on one of the cylinder groups is partially regenerated and the other cylinder group is selected for disablement (based on the alternating pattern), fueling may be continued to the partially regenerated catalyst, to complete regeneration, before the cylinders of that engine can be operated. Consequently, additional fuel may be consumed to complete the regeneration. As such, this results in degraded fuel economy.

Thus, in one example, the above issue may be at least partly addressed by a method of operating an engine including a first group of cylinders coupled to a first catalyst and a second group of cylinders coupled to a second catalyst. In one embodiment, the method comprises, selectively deactivating either the first or the second group of cylinders, the selective deactivation based on a regeneration state of the first catalyst relative to the second catalyst. In this way, by selecting the group of cylinders with the less regenerated catalyst, additional fuel may not be wasted in completing catalyst regeneration.

For example, a variable displacement engine (VDE) may be configured with a first and a second group of cylinders, each cylinder including a selectively deactivatable fuel injector. In response to a cylinder deactivation request (such as, at low engine loads), an engine control system may compare the regeneration state of a first catalyst, coupled to the first group of cylinders, relative to a second catalyst, coupled to the second group of cylinders. If the first catalyst is less regenerated than the second catalyst, the first catalyst may be selected for deactivation. In comparison, if the second catalyst is less regenerated than the first catalyst, the second catalyst may be selected for deactivation. In another embodiment, the selection may be further based on a catalyst temperature. As such, if both the catalysts are sufficiently regenerated, the control system may select a cylinder group based on the deactivation order. Thus, if the first group of cylinders was deactivated in the previous VDE cycle, the second group of cylinders may be selected for deactivation on the current cycle, and vice versa. By alternating cylinder group deactivation when both catalysts are substantially regenerated, engine wear and tear may be balanced between the two groups of cylinders.

In this way, by selecting a group of cylinders based on the regeneration state of exhaust catalysts, fuel wastage can be reduced. Specifically, by selectively deactivating a group of cylinders that is coupled to a partially regenerated catalyst, even if the same group of cylinders was previously deactivated in a preceding VDE cycle, fuel loss related to complete regeneration of a catalyst (on a cylinder group that is subsequently deactivated), can be pre-empted. In this way, fuel economy may be improved without substantially affecting engine or catalyst wear.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
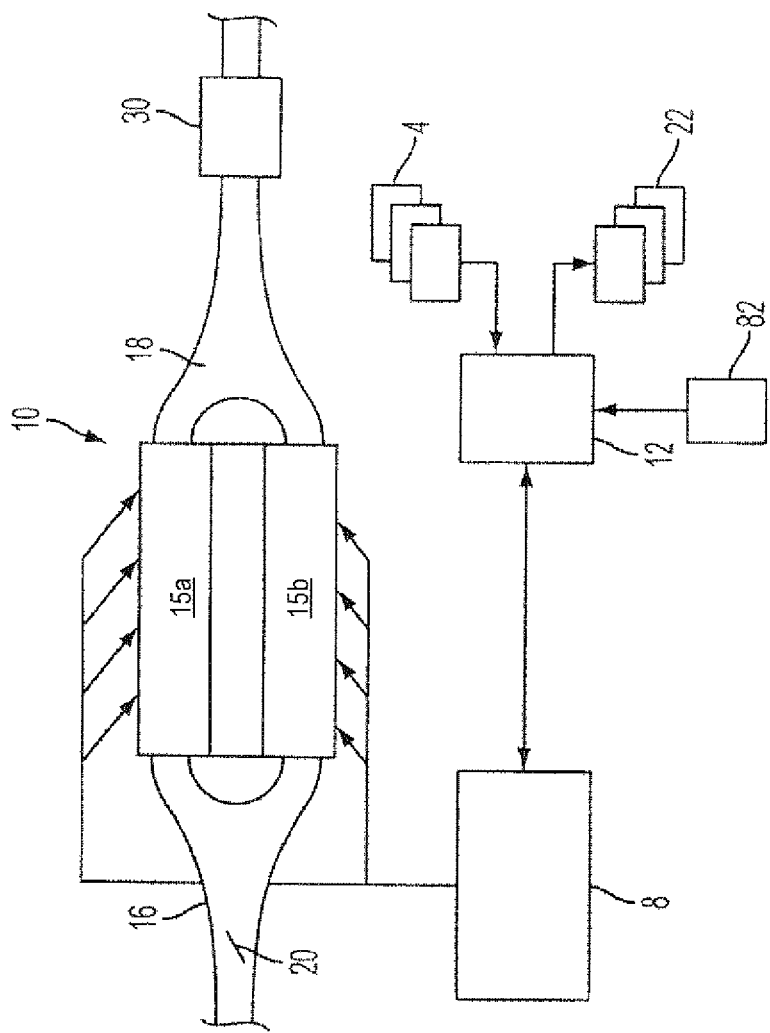
FIG. 1 shows an example layout of a variable displacement engine system.
Figure 2A:
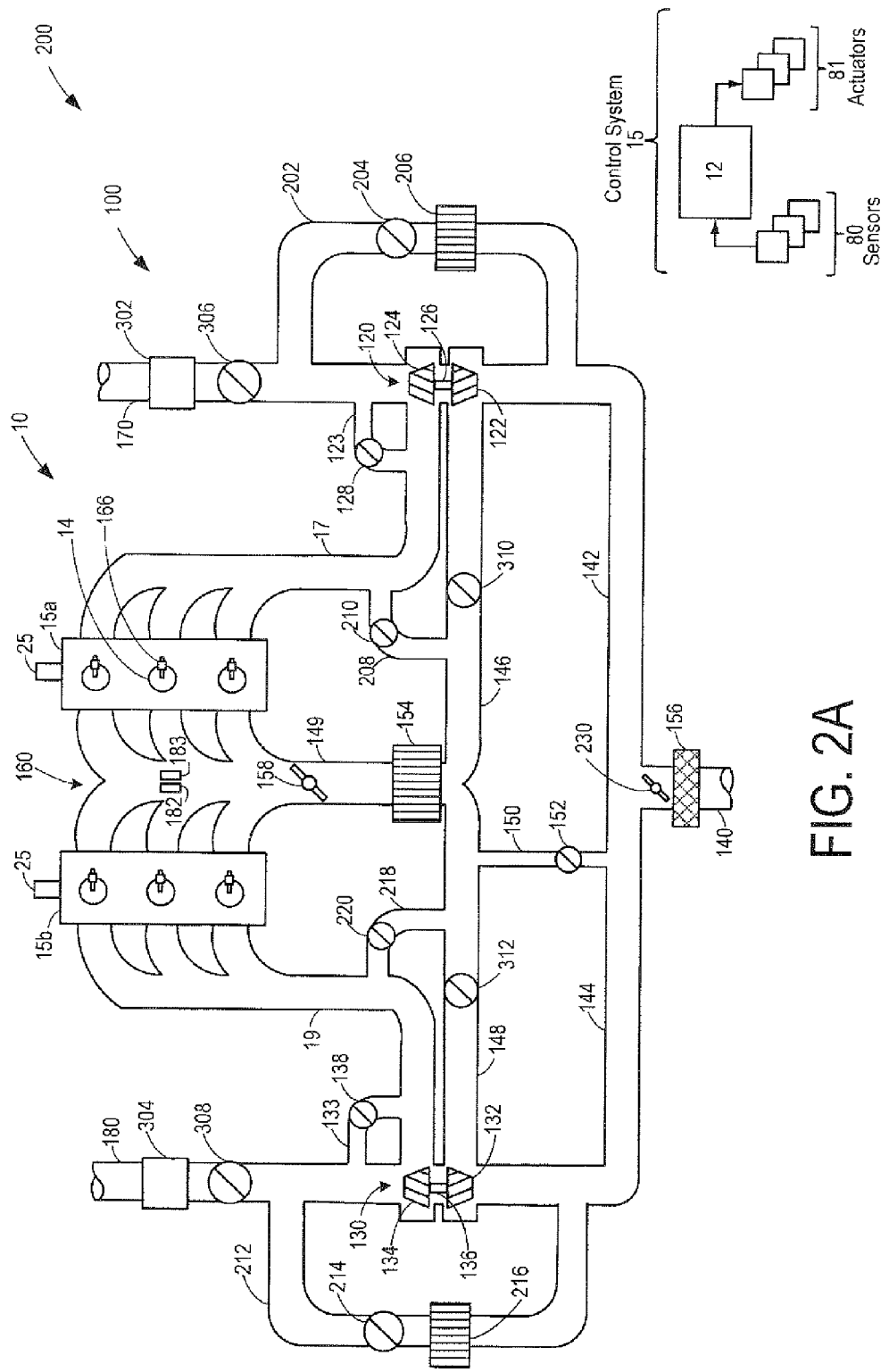
FIGS. 2A-C show alternate embodiments of the variable displacement engine system of FIG. 1 including a turbocharger.
Figure 2B:
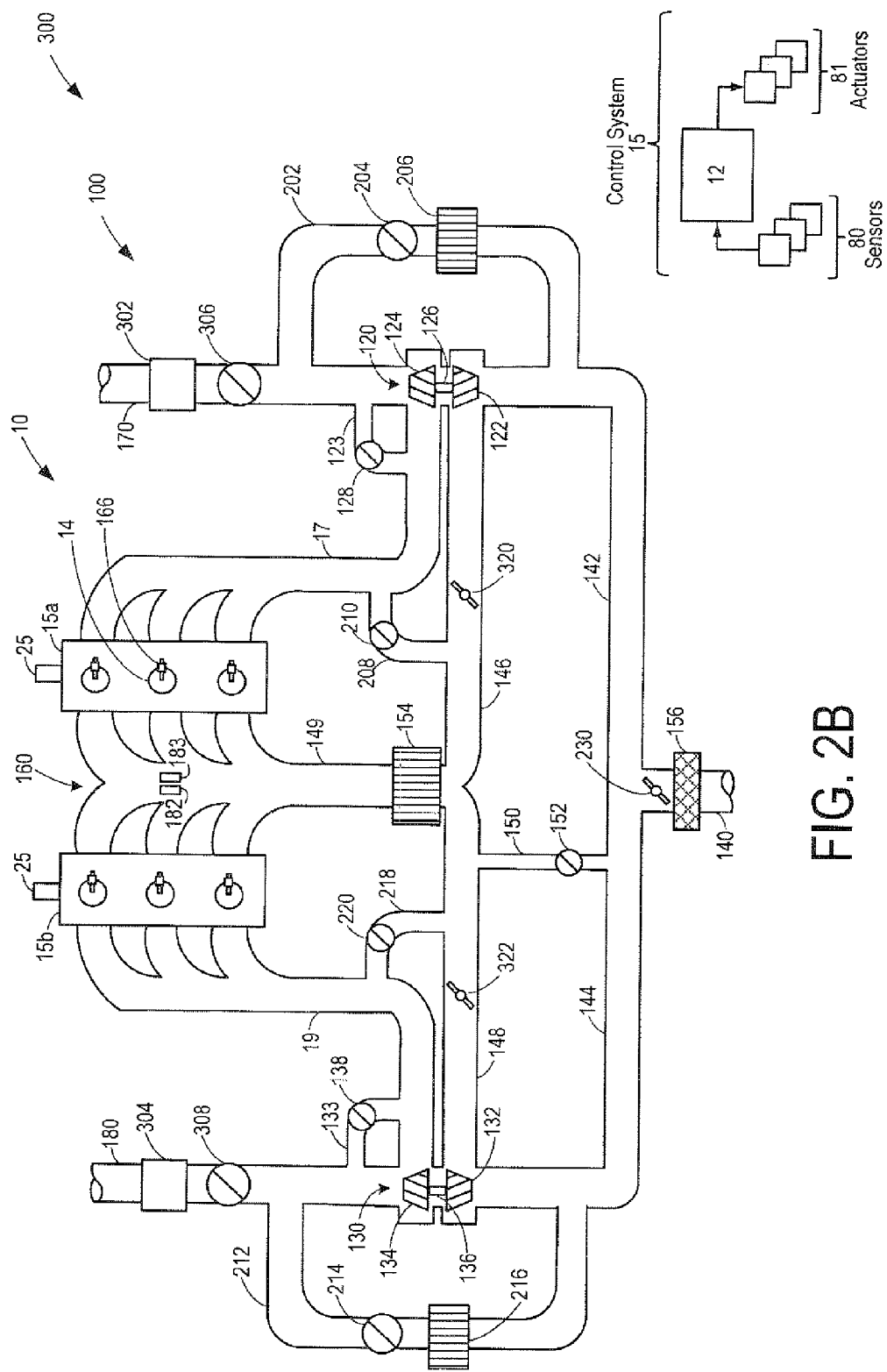
Figure 2C:
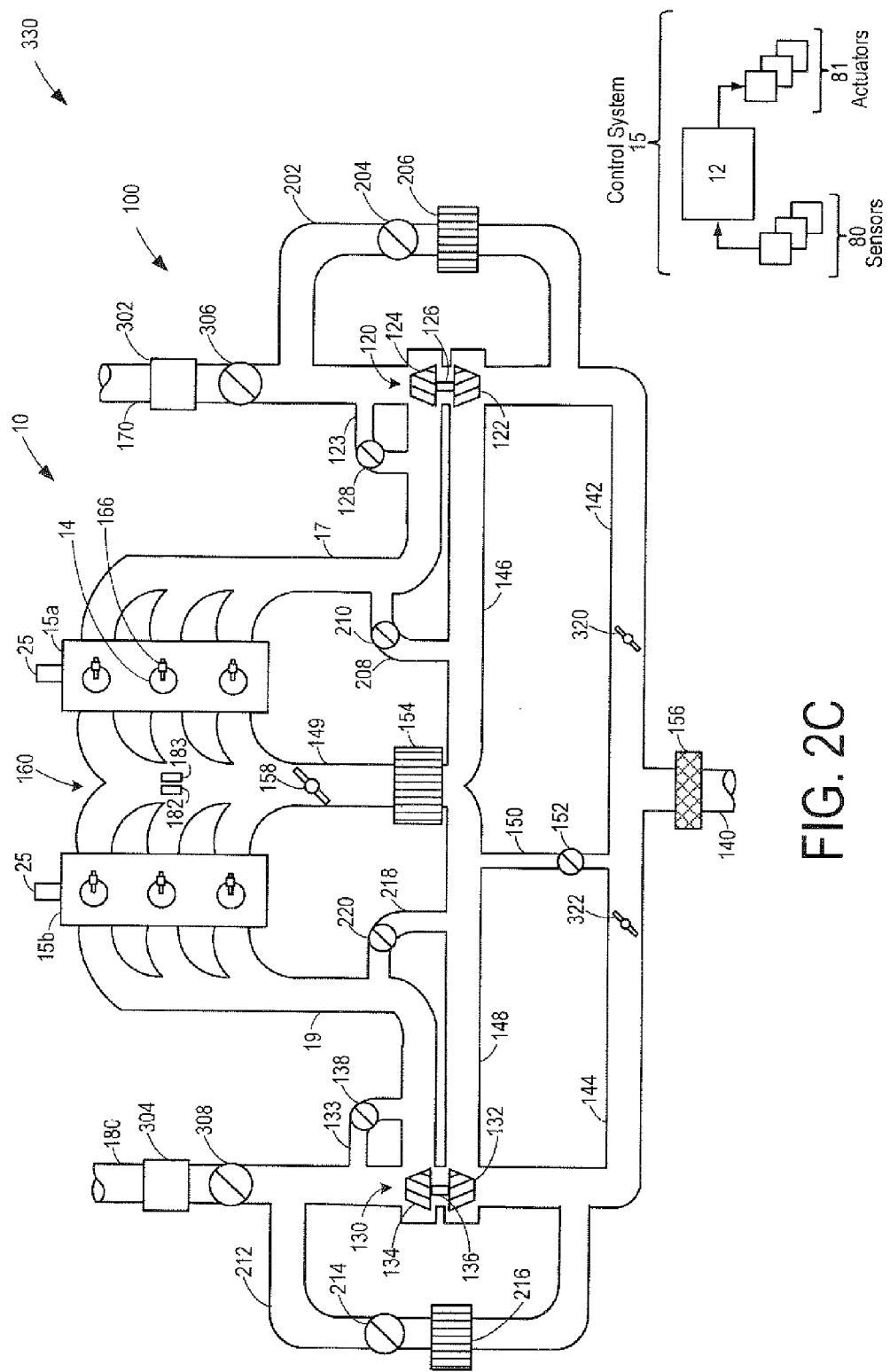
Figure 3:
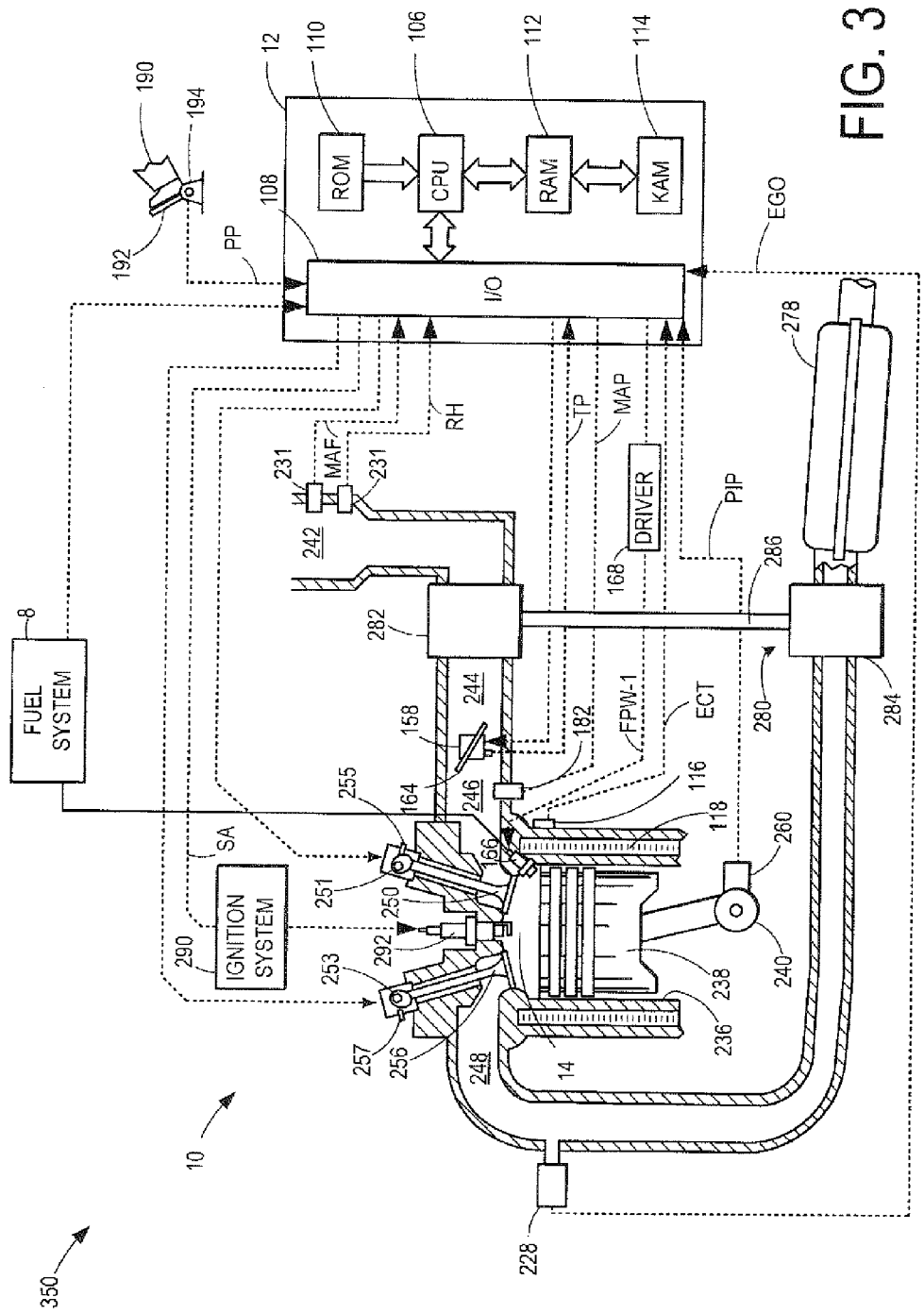
FIG. 3 shows a partial engine view of the engine system of FIG. 1.
Figure 4:
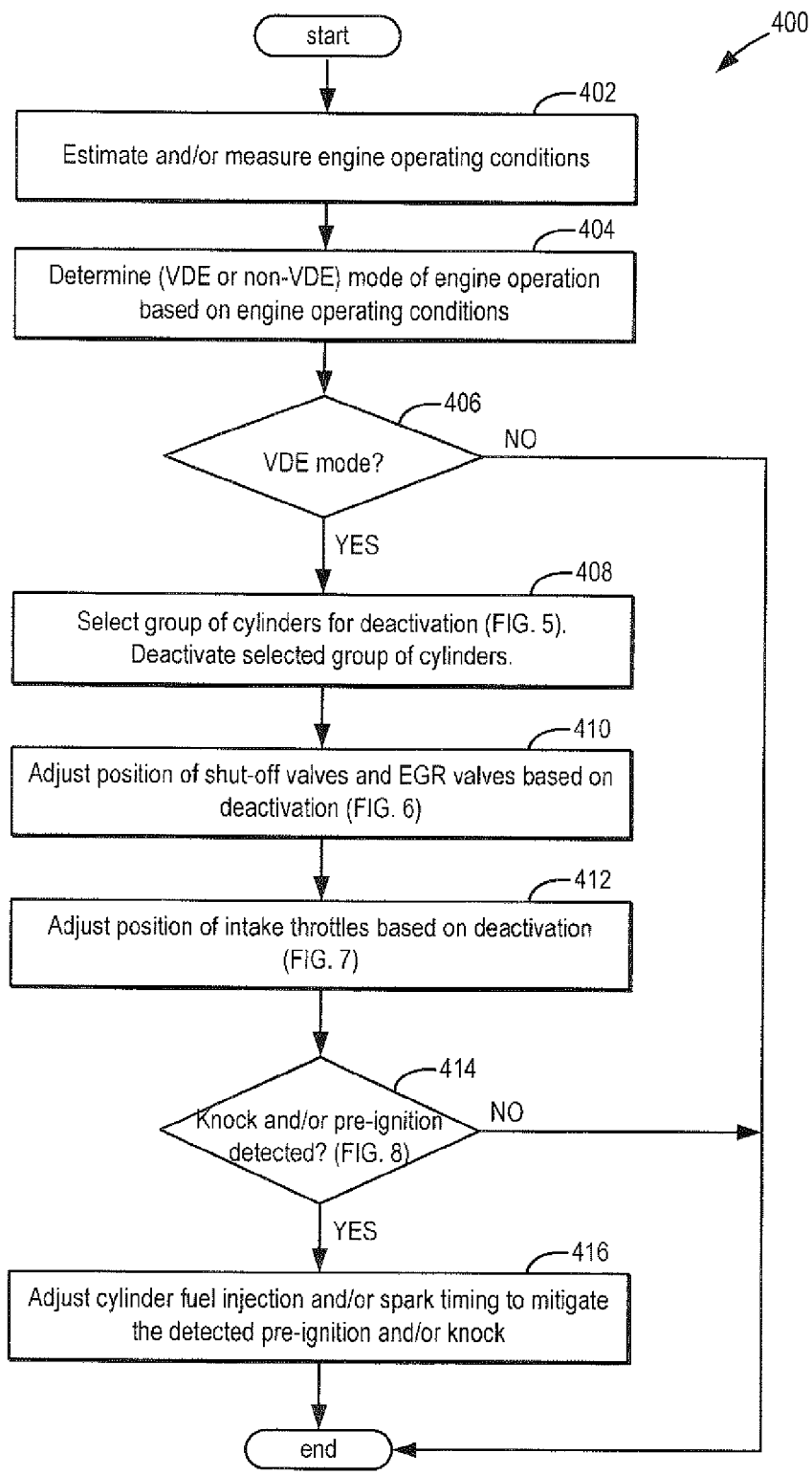
FIG. 4 shows a high level flow chart for operating the variable displacement engine system of FIG. 1.
Figure 5:
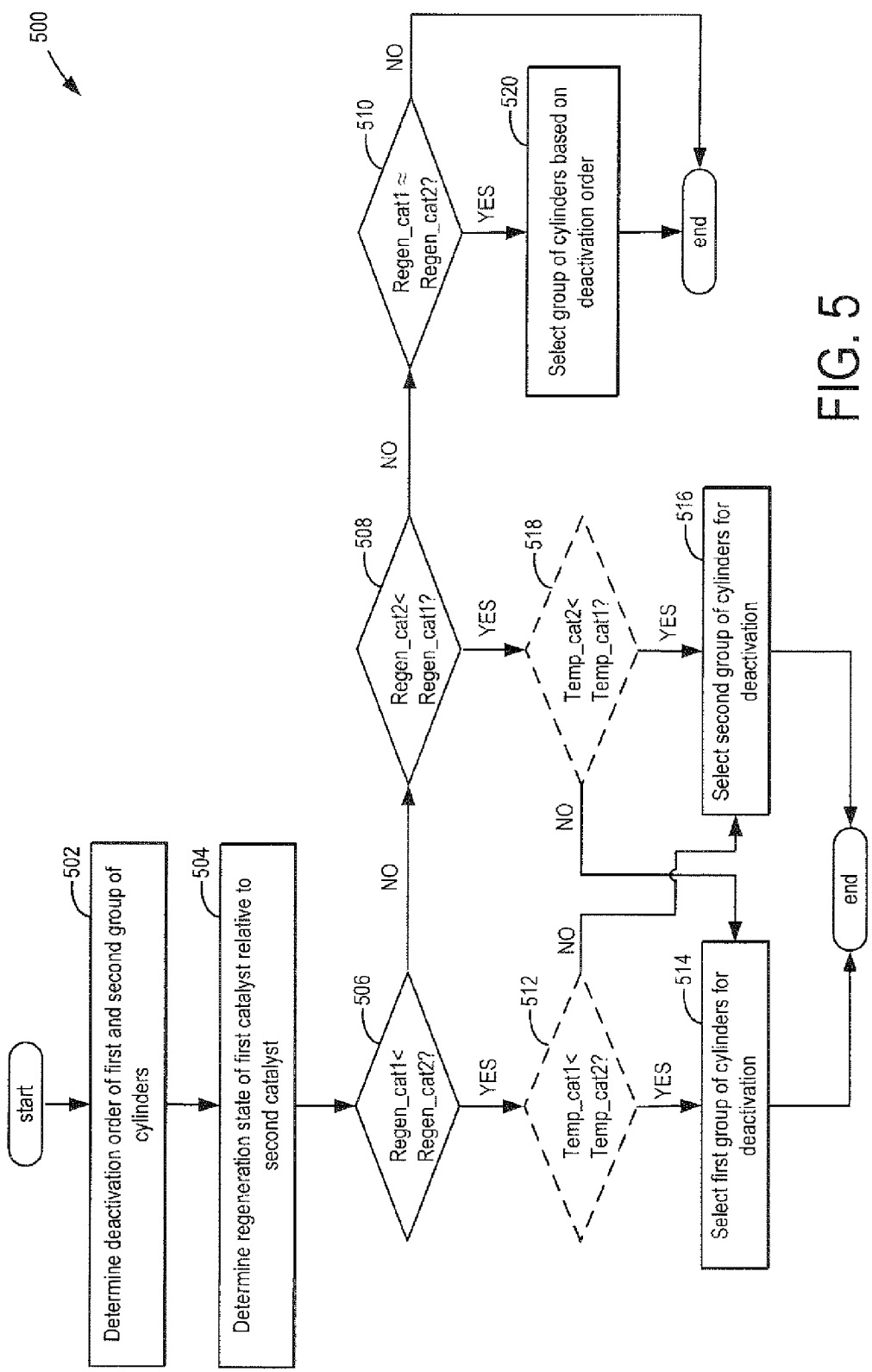
FIG. 5 shows a high level flow chart for selecting a cylinder group for deactivation.
Figure 6:
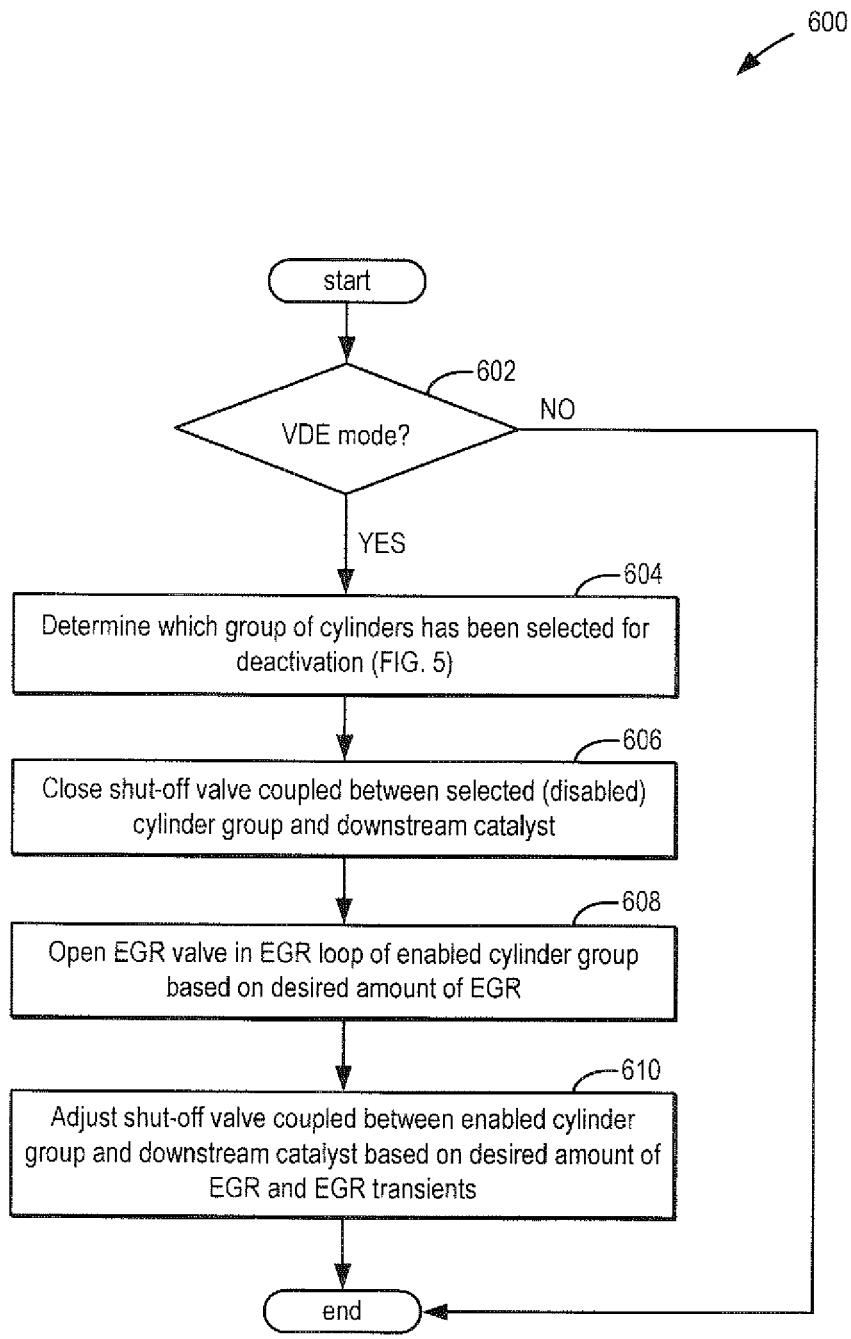
FIGS. 6-7 show a high level flow chart for adjusting the position of one or more valves and throttles of the engine system of FIG. 1 based on the deactivation.
Figure 7:
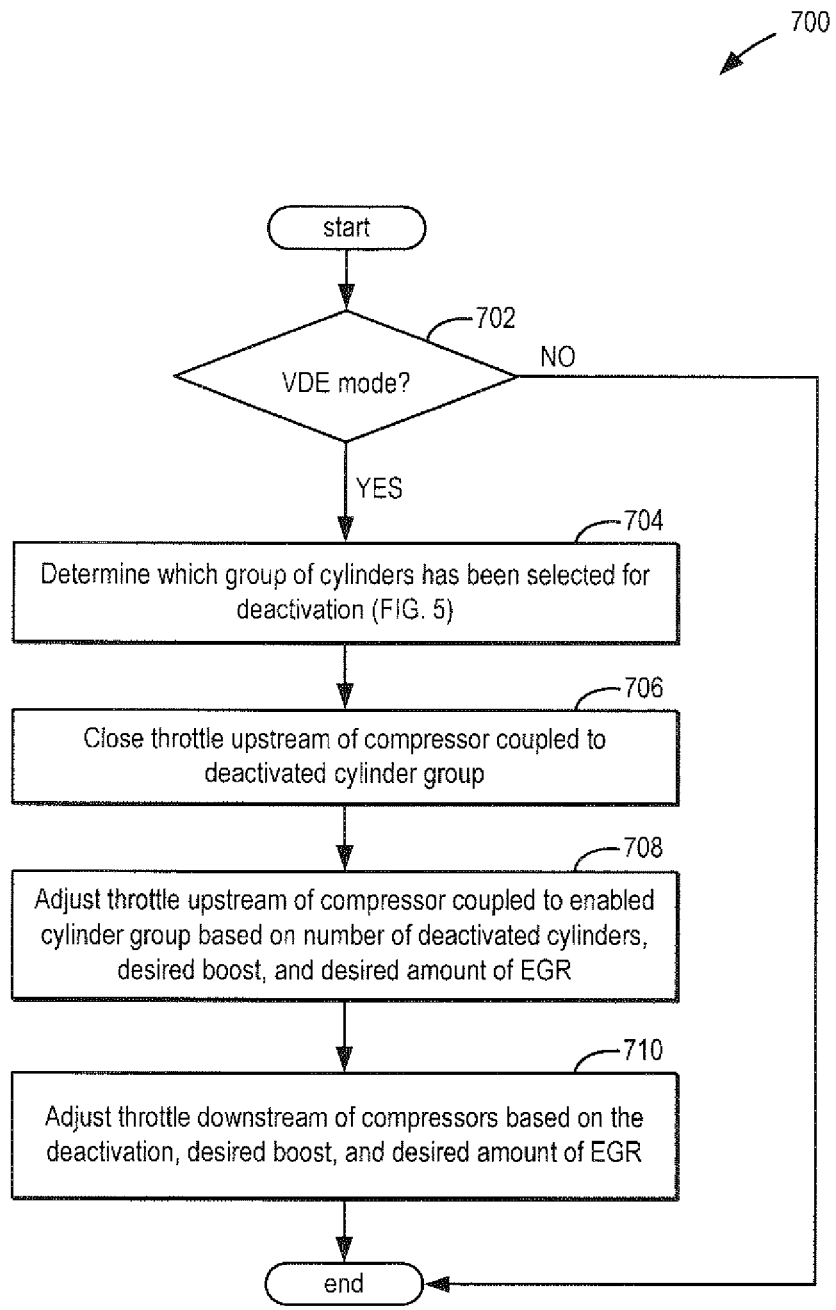

The following description relates to systems and methods for adjusting cylinder operation in a boosted engine system (such as the VDE engine system of FIGS. 1-3). The engine system may switch between operation with all cylinders firing or fewer cylinders firing by selectively deactivating one or more cylinder fuel injectors. An engine controller may select a group of cylinders for deactivation based on a regeneration state of a downstream catalyst (FIGS. 4-5). Based on the selection, the position of one or more valves and throttles may be adjusted to maintain catalyst temperature, reduce backflow through the disabled group of cylinders, improve boost operations, and coordinate EGR operations with VDE operations (FIGS. 6-7). The engine control system may also adjust each of a window and a threshold for knock and pre-ignition detection based on the deactivation (FIG. 8) to improve detection and mitigation of abnormal cylinder combustion events. In this way, by adjusting various cylinder operations in a VDE system based on the deactivation, fuel economy and engine performance improvements can be achieved.

FIG. 1 shows an example variable displacement engine (VDE) 10 having a first bank 15a and a second bank 15b. In the depicted example, engine 10 is a V8 engine with the first and second banks each having four cylinders. Engine 10 has an intake manifold 16, with throttle 20, and an exhaust manifold 18 coupled to an emission control system 30. Emission control system 30 includes one or more catalysts and air-fuel ratio sensors, such as described with regard to FIG. 2A. As one non-limiting example, engine 10 can be included as part of a propulsion system for a passenger vehicle.

During selected conditions, such as when the full torque capability of the engine is not needed, one of a first or a second cylinder group may be selected for deactivation (herein also referred to as a VDE mode of operation). Specifically, one or more cylinders of the selected group of cylinders may be deactivated by shutting off respective fuel injectors while maintaining operation of the intake and exhaust valves such that air may continue to be pumped through the cylinders. While fuel injectors of the disabled cylinders are turned off, the remaining enabled cylinders continue to carry out combustion with fuel injectors active and operating. To meet the torque requirements, the engine produces the same amount of torque on those cylinders for which the injectors remain enabled. This requires higher manifold pressures, resulting in lowered pumping losses and increased engine efficiency. Also, the lower effective surface area (from only the enabled cylinders) exposed to combustion reduces engine heat losses, improving the thermal efficiency of the engine. In alternate examples, engine system 10 may have cylinders with selectively deactivatable intake and/or exhaust valves.

Cylinders may be grouped for deactivation in a bank-specific manner. For example, in FIG. 1, the first group of cylinders may include the four cylinders of the first bank 15a while the second group of cylinders may include the four cylinders of the second bank 15b. In an alternate example, instead of one or more cylinders from each bank being deactivated together, two cylinders from each bank of the V8 engine may be selectively deactivated together.

Engine 10 may operate on a plurality of substances, which may be delivered via fuel system 8. Engine 10 may be controlled at least partially by a control system including controller 12. Controller 12 may receive various signals from sensors 4 coupled to engine 10, and send control signals to various actuators 22 coupled to the engine and/or vehicle.

Fuel system 8 may be further coupled to a fuel vapor recovery system (not shown) including one or more canisters for storing refueling and diurnal fuel vapors. During selected conditions, one or more valves of the fuel vapor recovery system may be adjusted to purge the stored fuel vapors to the engine intake manifold to improve fuel economy and reduce exhaust emissions. In one example, the purge vapors may be directed near the intake valve of specific cylinders. For example, during a VDE mode of operation, purge vapors may be directed only to the cylinders that are firing. This may be achieved in engines configured with distinct intake manifolds for distinct groups of cylinders. Alternatively, one or more vapor management valves may be controlled to determine which cylinder gets the purge vapors.

Controller 12 may receive an indication of cylinder knock or pre-ignition from one or more knock sensors 82 distributed along the engine block. When included, the plurality of knock sensors may be distributed symmetrically or asymmetrically along the engine block. As such, the one or more knock sensors 82 may be accelerometers, or ionization sensors. Further details of the engine 10 and an example cylinder are described with regard to FIGS. 2A-C and 3.

FIG. 2A is a schematic depiction of a first embodiment 200 of an example turbocharged variable displacement engine system 100 including multi-cylinder internal combustion engine 10 (of FIG. 1) and twin turbochargers 120 and 130. Engine system 100 can receive intake air via intake passage 140. Intake passage 140 may include an air filter 156 and an air intake system (AIS) throttle valve 230. AIS throttle 230 may be positioned in the engine intake upstream of the first and second compressors 122, 132, and upstream of a split point from where the first and second parallel intake passages 142 and 144 diverge. The position of AIS throttle 230 may also be adjusted to generate vacuum to help with EGR flow, as described herein.

Engine system 100 may be a split-engine system wherein intake passage 140 is branched downstream of AIS throttle valve 230, at a branch point, into first and second parallel intake passages 142 and 144, each including a turbocharger compressor. Specifically, at least a portion of intake air is directed to compressor 122 of turbocharger 120 via first parallel intake passage 142 and at least another portion of the intake air is directed to compressor 132 of turbocharger 130 via second parallel intake passage 144.

The first portion of the total intake air that is compressed by compressor 122 may be supplied to intake manifold 160 via first parallel branched intake passage 146. Herein, intake passages 142 and 146 may form a first branch of the engine's air intake system. Similarly, a second portion of the total intake air may be compressed via compressor 132 where it may be supplied to intake manifold 160 via second parallel branched intake passage 148. Herein, intake passages 144 and 148 may form a second parallel branch of the engine's air intake system. As shown in FIG. 2A, intake air from intake passages 146 and 148 can be recombined, via a common intake passage 149 before reaching intake manifold 160. From there, the intake air may be provided to the engine. Intake passage 149 may include an air cooler 154 for cooling boosted air received from the turbocharger compressors. Intake manifold 160 may include an intake manifold pressure sensor 182 for estimating a manifold pressure (MAP) and/or an intake manifold temperature sensor 183 for estimating a manifold air temperature (MCT), each communicating with controller 12.

Air intake throttle 158 may be positioned in the engine intake downstream of the first and second compressors, and downstream of a merge point where first and second parallel branched intake passages 146 and 148 merge to form common intake passage 149. When one of the cylinder groups is deactivated (that is, when the engine is operating in a VDE mode), the position of air intake throttle 158 may be adjusted by controller 12 to control an amount of air entering the engine, thereby enabling a desired torque to be provided. For example, throttle 158 may be opened to allow the active cylinder group to generate the same torque as was previously being generated by the two cylinder groups. During the transition to the deactivation state, throttle 158 may be opened to allow the intake MAP to increase. At the same time, spark may be retarded (e.g., by a first amount) to maintain a constant torque on all the cylinders, thereby reducing cylinder torque disturbances. When there is sufficient MAP, one or more fuel injectors of the selected group of cylinders may be turned off, while spark timing is restored. In the same way, during a transition out of the deactivated state (that is, during reactivation), while the disabled fuel injectors are being turned on, throttle 158 may be closed to allow the intake MAP to decrease. At the same time, spark may be retarded (e.g., by a second, different amount) to maintain a constant torque on all the cylinders, thereby reducing cylinder torque disturbances. When sufficient MAP is restored, spark timing may be restored Engine 10 may include a plurality of cylinders 14. In the depicted example, engine 10 is shown with six cylinders arranged in a V-configuration. Specifically, the six cylinders are arranged on two banks (or groups of cylinders) 15a and 15b, with each bank including three cylinders. In another example, such as elaborated with reference to FIG. 1, the engine may have four cylinders on each bank. Each cylinder 14 may be configured with a fuel injector 166. In the depicted example, fuel injector 166 is a direct in-cylinder injector. However, in other examples, fuel injector 166 can be configured as a port fuel injector. Further details of a single cylinder 14 are described below in FIG. 3.

Intake air supplied to cylinders 14 via common intake passage 149 may be used for fuel combustion. Products of combustion may then be exhausted via bank-specific parallel exhaust passages (as shown) or via a common exhaust passage. In the depicted example, exhaust from the first group of cylinders 15a is directed to first parallel exhaust passage 17 while exhaust from the second group of cylinders 15b is directed to second parallel exhaust passage 19. Each of the first and second parallel exhaust passages 17 and 19 may further include a turbocharger turbine. Specifically, exhaust gas is directed through exhaust passage 17 to drive exhaust turbine 124 of turbocharger 120, which in turn can provide mechanical work to compressor 122 via shaft 126 in order to provide compression to the intake air. Alternatively, some or all of the exhaust gas in exhaust passage 17 can bypass turbine 124 via turbine bypass passage 123 as controlled by wastegate 128. Similarly, exhaust is directed through exhaust passage 19 to drive exhaust turbine 134 of turbocharger 130, which in turn can provide mechanical work to compressor 132 via shaft 136 in order to provide compression to intake air flowing through the second branch of the engine's intake system. Alternatively, some or all of the exhaust gas in exhaust passage 19 can bypass turbine 134 via turbine bypass passage 133 as controlled by wastegate 138.

An anti-surge valve 152 may be provided to selectively bypass the compressor stages of turbochargers 120 and 130 via bypass passage 150. As one example, anti-surge valve 152 can open to enable flow through bypass passage 150 when the intake air pressure upstream of the compressors attains a threshold value.

In some examples, exhaust turbines 124 and 134 may be configured as variable geometry turbines, wherein controller 12 may adjust the position of the turbine impeller blades (or vanes) to vary the level of energy that is obtained from the exhaust gas flow and imparted to their respective compressor. Alternatively, exhaust turbines 124 and 134 may be configured as variable nozzle turbines, wherein controller 12 may adjust the position of the turbine nozzle to vary the level of energy that is obtained from the exhaust gas flow, and imparted to their respective compressors. For example, the control system can be configured to independently vary the vane or nozzle position of the exhaust gas turbines 124 and 134 via respective actuators.

Exhaust gases in first parallel exhaust passage 17 may be directed to the atmosphere via branched parallel exhaust passage 170 while exhaust gases in second parallel exhaust passage 19 may be directed to the atmosphere via branched parallel exhaust passage 180. Exhaust passage 170 may include an emission control device, such as a first catalyst 302 coupled downstream of the first group of cylinders, while exhaust passage 180 may include an emission control device, such as a second catalyst 304 coupled downstream of the second group of cylinders. Various exhaust gas sensors may be coupled to the emission control devices, as further elaborated in FIG. 3. These may include, for example, a first temperature sensor (not shown) for estimating a temperature of the first catalyst 302 and a second temperature sensor (not shown) for estimating a temperature of the second catalyst 304. Other sensors may include, for example, a first set of exhaust gas oxygen sensors (not shown) coupled across the first catalyst 302 to estimate a regeneration state of the first catalyst (e.g., based on an air-to-fuel ratio differential across the first catalyst), and a second set of exhaust gas oxygen sensors (not shown) coupled across the second catalyst 304 to estimate a regeneration state of the second catalyst (e.g., based on an air-to-fuel ratio differential across the second catalyst). First catalyst 302 may be coupled to first group of cylinders 15a, downstream of turbine 124, via a first shut-off valve 306. Likewise, second catalyst 304 may be coupled to second group of cylinders 15b, downstream of turbine 134, via a second shut-off valve 308. As elaborated with reference to FIG. 6, by adjusting the position of the first and/or second shut-off valve based on which cylinder group is selected for deactivation, fall in catalyst temperature and flooding of the catalyst with oxygen can be reduced, thereby reducing an amount of fuel needed for catalyst regeneration.

While the depicted embodiment shows each exhaust passage including respective shut-off valves coupled upstream of respective exhaust catalysts, in an alternate embodiment (not shown), the exhaust passages may be coupled via valves and passages that allow at least a portion of exhaust gas from the enabled group of cylinders to be directed through the catalyst of the disabled group of cylinders. For example, an exhaust branch passage may couple the first parallel exhaust passage, downstream of the first catalyst, to the second parallel exhaust passage, upstream of the second catalyst. When the second cylinder group is deactivated, a valve in the exhaust branch passage may divert at least some exhaust gas from the first exhaust passage through the second catalyst, warming the second catalyst and reducing the fuel penalty of regeneration.

In still another embodiment (not shown), each exhaust passage may further include a bypass passage for directing air or exhaust to the atmosphere around (but not through) the respective catalysts. Herein, the shut-off valve coupled upstream of the catalyst may be configured as a diverter valve configured to divert pure air from the disabled cylinder group into the bypass passage, and around the catalyst, in response to deactivation of the cylinder group.

In yet another embodiment, the engine may be configured with valves and passages for recirculating the pure air from the disabled cylinder group back to the intake manifold, without directing the air through the catalyst. For example, a diverter passage may be configured to direct exhaust gas from upstream of the catalyst into the intake manifold. Herein, in addition to keeping the catalyst warm and reducing oxygen saturation of the catalyst coupled to the disabled cylinder group, the exhaust pressure of the disabled cylinder group may be matched to the intake pressure, reducing pumping losses and improving engine efficiency.

While the depicted embodiment shows parallel exhaust passages directing exhaust to respective emission control devices, in alternate embodiments, the catalysts may be configured as split catalyst systems wherein airflow from different cylinders (or different cylinder groups) are directed to different sections of a catalyst brick. Specifically, the split catalyst system may allow hot exhaust from enabled cylinders to flow through one section of the catalyst brick while cooler air from the disabled cylinders flows through a different section of the catalyst brick. Heat from the hot exhaust of the enabled cylinders is transferred to the catalyst brick while cooler air from the disabled cylinders cools the catalyst. In this way, heat can be transferred from the hot side of the catalyst to the cold side, keeping the entire catalyst warm. In one embodiment, heat transfer may be improved by using a metallic substrate for the catalyst.

Engine 10 may further include one or more exhaust gas recirculation (EGR) loops for recirculating at least a portion of exhaust gas from first and second parallel exhaust passages 17 and 19 and/or first and second parallel branched exhaust passages 170 and 180, to first and second parallel intake passages 142 and 144, and/or parallel branched intake passages 146 and 148. These may include high-pressure EGR loops for proving high-pressure EGR (HP-EGR) and low-pressure EGR-loops for providing low-pressure EGR (LP-EGR). In one example, HP-EGR may be provided in the absence of boost provided by turbochargers 120, 130, while LP-EGR may be provided in the presence of turbocharger boost and/or when exhaust gas temperature is above a threshold. In still other examples, both HP-EGR and LP-EGR may be provided simultaneously.

In the depicted example, engine 10 may include a first low-pressure EGR loop 202 for recirculating at least some exhaust gas to the first group of cylinders 15a, specifically, from the first branched parallel exhaust passage 170, downstream of the turbine 124, to the first parallel intake passage 142, upstream of the compressor 122. Likewise, the engine may include a second low-pressure EGR loop 212 for recirculating at least some exhaust gas to the second group of cylinders 15b, specifically, from the second branched parallel exhaust passage 180, downstream of the turbine 134, to the second parallel intake passage 144, upstream of the compressor 132. First and second LP-EGR loops 202 and 212 may include respective LP-EGR valves 204 and 214 for controlling an amount of exhaust gas recirculated (that is, EGR flow) through the loops. The first and second EGR loops may also include respective charge air coolers 206 and 216 for lowering a temperature of exhaust gas flowing through the respective EGR loops before recirculation into the engine intake. Under certain conditions, the charge air coolers 206, 216 may also be used to heat the exhaust gas flowing through LP-EGR loops 202, 212 before the exhaust gas enters the compressor to avoid water droplets impinging on the compressors.

Engine 10 may further include a first high-pressure EGR loop 208 for recirculating at least some exhaust gas to the first group of cylinders 15a, specifically, from the first parallel exhaust passage 17, upstream of the turbine 124, to the first branched parallel intake passage 146, downstream of the compressor 122. Likewise, the engine may include a second high-pressure EGR loop 218 for recirculating at least some exhaust gas to the second group of cylinders 15b, specifically, from the second parallel exhaust passage 180, upstream of the turbine 134, to the second branched parallel intake passage 148, downstream of the compressor 132. EGR flow through HP-EGR loops 208 and 218 may be controlled via respective HP-EGR valves 210 and 220. The EGR loops may include various sensors for estimating the EGR. These may include, for example, air-to-fuel ratio sensors, temperature sensors, pressure sensors, and humidity sensors.

During a VDE mode of engine operation, exhaust energy generated in the exhaust of the disabled cylinder group is not sufficient to drive the corresponding turbine. In some cases, boost pressure generated by the compressor coupled to the enabled cylinder group may backflow to the disabled cylinder group, overwhelming the weakly operating turbine. To reduce boost losses resulting from such backflow, one or more backflow valves or throttles may be included. In one example, as shown in FIG. 2A, a first backflow valve 310 may be included in first parallel branched intake passage 146, downstream of first compressor 122. Additionally, or optionally, a second backflow valve 312 may be included in second parallel branched intake passage 148, downstream of second compressor 132. Backflow valves 310 and 312 may be passive valves, or active valves. In one example, backflow valves 310 and 312 may be flap valves. As elaborated with reference to FIG. 7, upon selecting a group of cylinders for deactivation, an engine controller may close the backflow valve coupled to the disabled group of cylinders. At the same time, the controller may adjust a position (or opening) of the backflow valve coupled to the enabled group of cylinders while operating the corresponding compressor, to provide a desired amount of boost to the engine. The position of downstream throttle 158 and/or upstream throttle 230 may be adjusted concurrently, as elaborated in FIG. 7, to assist in providing the desired boost, with reduced torque disturbances, in particular as the selected cylinder group is deactivated or reactivated.

FIG. 2B shows an alternate embodiment 300 of engine system 100 including throttles for reducing backflow in place of the backflow valves of FIG. 2A. Specifically, embodiment 300 depicts first parallel branched intake passage 146 including a first backflow throttle valve 320 coupled downstream of the first turbocharger compressor 122, and second parallel branched intake passage 148 including a second backflow throttle valve 322 coupled downstream of the second turbocharger compressor 132. In the depicted configuration, in lieu of adjusting throttle 158 in the intake manifold, the position of the two throttles installed upstream of the merge point of the parallel branched intake passages may be adjusted to provide an amount of boost while reducing backflow issues (FIG. 7). Thus, in the depicted embodiment, throttle 158 may not be included.

FIG. 2C shows yet another embodiment 350 of engine system 100 also including throttles for reducing backflow in place of the backflow valves of FIG. 2A. In the depicted embodiment, the throttles are positioned upstream of the respective compressors. Specifically, embodiment 350 depicts first parallel intake passage 142 including the first backflow throttle valve 320 coupled upstream of the first turbocharger compressor 122, and second parallel intake passage 144 including second backflow throttle valve 322 coupled upstream of the second turbocharger compressor 132. In the depicted configuration, in lieu of adjusting AIS throttle valve 230, the two throttles installed upstream of the branch point of the parallel intake passages are adjusted to provide an amount of boost while reducing backflow issues. Thus, in the depicted embodiment, throttle 230 may not be included. As elaborated in FIG. 7, the throttles may be further adjusted to generate a vacuum in the respectively coupled EGR loops and adjust an amount of EGR directed therethrough. By adjusting the various valves and throttles based on the selective deactivation of a group of cylinders, VDE transitions may be improved, while also improving boost generation during a VDE mode of operation.

Returning to FIG. 2A, the position of intake and exhaust valves of each cylinder 14 may be regulated via hydraulically actuated lifters coupled to valve pushrods, or via a cam profile switching mechanism in which cam lobes are used. For example, the intake valves of each cylinder 14, or each cylinder group (15a, 15b), may be controlled by cam actuation using a cam actuation system. Specifically, the intake valve cam actuation system 25 may include one or more cams and may utilize variable cam timing or lift for intake and/or exhaust valves. In alternative embodiments, the intake valves may be controlled by electric valve actuation. Similarly, the exhaust valves may be controlled by cam actuation systems or electric valve actuation. Valve actuation is elaborated herein with reference to FIG. 3.

Engine system 100 may be controlled at least partially by a control system 15 including controller 12 and by input from a vehicle operator via an input device (not shown). Control system 15 is shown receiving information from a plurality of sensors 80 (various examples of which are described herein) and sending control signals to a plurality of actuators 81. As one example, sensors 80 may include temperature sensors and air-to-fuel ratio sensors coupled to the exhaust catalysts, MAP sensor 182, and MAT sensor 183, etc. In some examples, common intake passage 149 may include a throttle inlet pressure (TIP) sensor for estimating a throttle inlet pressure (TIP) and/or a throttle inlet temperature sensor for estimating a throttle air temperature (TCT). In other examples, one or more of the EGR passages may include pressure, temperature, and air-to-fuel ratio sensors, for determining EGR flow characteristics. Additional system sensors and actuators are elaborated below with reference to FIG. 3. As another example, actuators 81 may include fuel injector 166, HP-EGR valves 210 and 220, LP-EGR valves 204 and 214, throttle valves 158 and 230, shut-off valves 306 and 308, back-flow valves (or throttles) 310 and 312, and wastegates 128, 138. Other actuators, such as a variety of additional valves and throttles, may be coupled to various locations in engine system 100. Controller 12 may receive input data from the various sensors, process the input data, and trigger the actuators in response to the processed input data based on instruction or code programmed therein corresponding to one or more routines. Example control routines are described herein with regard to FIGS. 4-8.

FIG. 3 depicts an example embodiment 300 of a cylinder or combustion chamber of internal combustion engine 10 (of FIGS. 1 and 2A-C). Engine 10 may receive control parameters from controller 12 and input from vehicle operator 190 via an input device 192, such as an accelerator pedal and a pedal position sensor 194 for generating a proportional pedal position signal PP. Cylinder (herein also "combustion chamber") 14 of engine 10 may include combustion chamber walls 236 with piston 238 positioned therein. Piston 238 may be coupled to crankshaft 240 so that reciprocating motion of the piston is translated into rotational motion of the crankshaft. Crankshaft 240 may be coupled to at least one drive wheel of the passenger vehicle via a transmission system. Further, a starter motor may be coupled to crankshaft 240 via a flywheel to enable a starting operation of engine 10.

Cylinder 14 can receive intake air via a series of intake air passages 242, 244, and 246. Intake air passage 246 can communicate with other cylinders of engine 10 in addition to cylinder 14. In some embodiments, one or more of the intake passages may include a boosting device such as a turbocharger 280. For example, FIG. 3 shows engine 10 configured with a turbocharger including a compressor 282 arranged between intake passages 242 and 244, and an exhaust turbine 284 arranged along exhaust passage 248. Compressor 282 may be at least partially powered by exhaust turbine 284 via a shaft 286 where the boosting device is configured as a turbocharger. A throttle valve 158 including a throttle plate 164 may be provided along an intake passage of the engine for varying the flow rate and/or pressure of intake air provided to the engine cylinders. For example, throttle valve 158 may be disposed downstream of compressor 282 as shown in FIGS. 2A and 2C, or alternatively may be provided upstream of a compressor. In some embodiments, such as shown in FIG. 2B, throttle valve 158 may be omitted wherein the intake passage may include one or more backflow throttle valves for varying the flow rate and/or pressure of the intake air.

Exhaust passage 248 can receive exhaust gases from other cylinders of engine 10 in addition to cylinder 14. Exhaust gas sensor 228 is shown coupled to exhaust passage 248 upstream of emission control device 278. Sensor 228 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example.

Emission control device 278 may be a three way catalyst (TWC), NOx trap, various other emission control devices, or combinations thereof.

Exhaust temperature may be estimated by one or more temperature sensors (not shown) located in exhaust passage 248. Alternatively, exhaust temperature may be inferred based on engine operating conditions such as speed, load, air-fuel ratio (AFR), spark retard, etc. Further, exhaust temperature may be computed by one or more exhaust gas sensors 228. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 250 and at least one exhaust poppet valve 256 located at an upper region of cylinder 14. In some embodiments, each cylinder of engine 10, including cylinder 14, may include at least two intake poppet valves and at least two exhaust poppet valves located at an upper region of the cylinder. Operation of intake valve 250 and exhaust valve 256 may be controlled by cam actuation via respective cam actuation systems 251 and 253. Cam actuation systems 251 and 253 may each include one or more cams and may utilize one or more of cam profile switching (CPS), variable cam timing (VCT), variable valve timing (VVT) and/or variable valve lift (VVL) systems that may be operated by controller 12 to vary valve operation. In alternative embodiments, the intake and/or exhaust valve may be controlled by electric valve actuation. In one example, cylinder 14 may include an intake valve controlled via cam actuation including VCT systems and an exhaust valve controlled via electric valve actuation. In one example, during a VDE mode of operation, when one or more fuel injectors are disabled, the camshaft timing for the enabled cylinders may be adjusted based on the desired torque while the camshaft timing for the disabled cylinders is adjusted to reduce pumping losses. Additionally, or optionally, a camshaft timing may be selected for the disabled cylinders that further reduces air flow through the disabled cylinder group, thereby lowering the airflow through the downstream catalyst. Herein, the camshaft timing adjustment may advantageously slow a cooling off of the catalyst.

In some embodiments, each cylinder of engine 10 may include a spark plug 292 for initiating combustion. Ignition system 290 can provide an ignition spark to combustion chamber 14 via spark plug 292 in response to spark advance signal SA from controller 12, under select operating modes. However, in some embodiments, spark plug 292 may be omitted, such as where engine 10 may initiate combustion by auto-ignition or by injection of fuel, as may be the case with some diesel engines.

In some embodiments, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter also referred to as "DI") of fuel into combustion cylinder 14. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 14.

Controller 12 is shown in FIG. 3 as a microcomputer, including microprocessor unit 106, input/output ports 108, an electronic storage medium for executable programs and calibration values shown as read only memory (ROM) chip 110 in this particular example, random access memory (RAM) 112, keep alive memory (KAM) 114, and a data bus. Storage medium read-only memory 110 can be programmed with computer readable data representing instructions executable by processor 102 for performing the methods described below as well as other variants that are anticipated but not specifically listed. Controller 12 may receive various signals from sensors coupled to engine 10, in addition to those signals previously discussed, including measurement of inducted mass air flow (MAF) from mass air flow sensor 231; engine coolant temperature (ECT) from temperature sensor 116 coupled to cooling sleeve 118; a profile ignition pickup signal (PIP) from Hall effect sensor 260 (or other type) coupled to crankshaft 240; throttle position (TP) from a throttle position sensor; and absolute manifold air pressure signal (MAP) from sensor 182. Engine speed signal, RPM, may be generated by controller 12 from signal PIP. Further, crankshaft position, as well as crankshaft acceleration, and crankshaft oscillations may also be identified based on the signal PIP. Manifold air pressure signal MAP from manifold pressure sensor 182 may be used to provide an indication of vacuum, or pressure, in the intake manifold. Further, as noted herein, manifold pressure may be estimated based on other operating parameters, such as based on MAF and RPM, for example.

As described above, FIG. 3 shows only one cylinder of a multi-cylinder engine, and as such, each cylinder may similarly include its own set of intake/exhaust valves, fuel injector, spark plug, etc.

The engine controller may periodically perform various on-board diagnostic tests to verify the functionality of the various valves and sensors of FIGS. 1-3. In one example, such as when the engine is in the non-VDE mode, the various tests may be performed only during deceleration fuel shut-off. In another example, when the engine is in the VDE mode, diagnostic routines may be executed on the disabled group of cylinders. In one example, based on an estimated amount of time that the engine is expected to operate in the VDE mode, one or more diagnostic tests may be selected (e.g., oxygen sensor control).

FIG. 4 depicts an example routine 400 that may be executed by an engine controller to determine a mode of operation of the VDE engine system. Specifically, based on engine operating conditions, it may be determined whether the engine is to be run with all cylinders firing (that is, non-VDE mode) or with one or more cylinders deactivated (that is, VDE mode). If the engine is to be operated in the VDE mode, a group of cylinders and a number of cylinders may be selected for the deactivation (FIG. 5). Based on the selection, the position of various engine system valves (FIG. 6) and throttles (FIG. 7) may be adjusted to maintain the operating conditions (e.g., temperature) of a catalyst coupled to the disabled group of cylinders during the deactivation, as well as to compensate for torque and/or EGR transients during the transitioning in to and/or out of the VDE mode of operation. In this way, during a VDE mode of operation, an emission control device can be maintained ready for operation in the non-VDE mode, and the engine can be smoothly transitioned between VDE and non-VDE modes.

At 402, the routine includes measuring and/or estimating engine operating conditions. The conditions assessed may include barometric pressure, a driver-demanded torque (for example, from a pedal-position sensor), manifold pressure (MAP), manifold air flow (MAF), engine temperature, air temperature, knock limits, etc.

At 404, based on the estimated operating conditions, the routine determines an engine mode of operation (e.g., VDE or non-VDE). In one example, where the engine is a V8 engine, during the VDE mode, the engine may be operated with only one group of cylinders activated (that is, in a V4 mode) while during the non-VDE mode, the engine may be operated with both groups of cylinders activated (that is, in a V8 mode).

At 406, it may be confirmed whether the engine is to be operated in the VDE (e.g., V4) mode. If not, the routine may end. If yes, then at 408, the routine includes selecting a group of cylinders for deactivation. In one example, such as with reference to the engine system of FIGS. 1-3, the engine may include a first and a second group of cylinders, and an engine controller may select either the first or the second group of cylinders for deactivation. As elaborated with reference to FIG. 5, the selection may be based on a regeneration state of a first catalyst coupled to the first group of cylinders relative to a second catalyst coupled to the second group of cylinders. Additionally, the selection may be further based on a temperature of the first catalyst relative to the second catalyst, as well as a deactivation order. Following the selection, the selected group of cylinders may be deactivated. Herein, the deactivation may include turning off fuel injectors while continuing to open or close intake and exhaust valves so as to pump air through the selected group of cylinders.

At 410, and as further elaborated at FIG. 6, based on the deactivation, the position of one or more engine system valves may be adjusted. The one or more valves that are adjusted may include EGR valves (e.g., valves 204, 214, 210 and 220 of FIG. 2A) as well as one or more shut-off valves (e.g., valves 306 and 308 of FIG. 2A). At 412, and as further elaborated at FIG. 7, based on the deactivation, the position of one or more engine system throttles may be adjusted. The one or more throttles that are adjusted may include intake throttles upstream of the turbocharger compressor (e.g., throttles 320 and 322 of FIG. 2C) as well as one or more throttles downstream of the turbocharger compressor (e.g., throttles 320 and 322 of FIG. 2B).

At 414, it may be determined whether any abnormal cylinder combustion event related to knock and/pre pre-ignition has been detected. As elaborated at FIG. 8, based on the deactivation, in particular the number of deactivated cylinders, each of a threshold and a window for knock detection and pre-ignition detection may be adjusted. As such, the background noise level may vary based on the number of firing cylinders. Thus, by adjusting the windows and thresholds based on the deactivation, abnormal combustion events with small noise levels, occurring during non-VDE modes of engine operation, as well as normal combustion events with large noise levels, occurring during VDE modes of engine operation, may be better distinguished.

If knock and/or pre-ignition is detected, then at 416, an appropriate mitigating action may be taken. For example, in response to cylinder knock, a spark timing adjustment (e.g., spark retard) may be performed. In comparison, in response to cylinder pre-ignition, a cylinder fuel injection adjustment (e.g., cylinder enrichment or cylinder enleanment for a duration) may be performed.

In this way, identification and distinction of abnormal combustion events may be improved, and better mitigated. By reducing the occurrence of cylinder knock and pre-ignition, engine degradation can be reduced while improving fuel economy.

Now turning to FIG. 5, an example routine 500 is shown for selecting a group of cylinders for deactivation based at least on a regeneration state of engine catalysts. The selection may be further based on a temperature of the catalysts as well as a deactivation order. By selecting a group of cylinders based on the regeneration state and temperature of the catalysts, fuel wastage related to completion of regeneration may be reduced. By selecting a group of cylinders based on the deactivation order, disablement of groups of cylinders may be alternated to balance engine and catalyst wear between the cylinders.

At 502, the routine includes determining the deactivation order of a first and a second group of cylinders. In one example, the deactivation order may be stored in the memory of a controller and updated after every deactivation (or VDE) cycle. The deactivation order may indicate which group of cylinders was deactivated in the preceding cycle(s), as well as how many cylinders of the selected cylinder group (and the identity of the cylinders) were deactivated during each preceding deactivation cycle.

At 504, the routine includes determining the regeneration state of the first catalyst coupled to the first group of cylinders and the second catalyst coupled to the second group of cylinders. In one example, the regeneration state of the first catalyst is estimated based on an air-to-fuel ratio differential across the first catalyst. The air-to-fuel ratio differential may be estimated by a first set of exhaust gas sensors (e.g., oxygen sensors) coupled across the first catalyst (e.g., one sensor upstream of, and another sensor downstream of the first catalyst). Likewise, the regeneration state of the second catalyst may be estimated based on an air-to-fuel ratio differential across the second catalyst, as determined by a second set of exhaust gas sensors (e.g., oxygen sensors) coupled across the second catalyst (e.g., one sensor upstream of, and another sensor downstream of the second catalyst). In an alternate example, the regeneration state of each catalyst may be based on an oxygen content of the catalyst, as estimated by an oxygen sensor coupled to the respective catalysts.

At 506, the regeneration state of the first catalyst may be compared to the regeneration state of the second catalyst. Specifically, it may be determined if the first catalyst is less regenerated than the second catalyst, for example, by at least a threshold amount (e.g., 20%). In one example, the first catalyst may be partially regenerated while the second catalyst is fully regenerated. In one embodiment of routine 500, wherein the selection is based on the regeneration state of the catalysts only, the routine may include selecting the first group of cylinders to be deactivated (at 514) when the first catalyst is less regenerated than the second catalyst (at 506).

If the first catalyst is not less regenerated than the second catalyst (at 506), then at 508, it may be confirmed if the second catalyst is less regenerated than the first catalyst, for example, by at least a threshold amount (e.g., 20%). In one example, the second catalyst may be partially regenerated while the first catalyst is fully regenerated. In the embodiment of routine 500 wherein the selection is based on the regeneration state of the catalysts only, the routine may include selecting the second group of cylinders to be deactivated (at 516) when the second catalyst is less regenerated than the first catalyst (at 508).

If the second catalyst is not less regenerated than the first catalyst (at 508), then at 510, it may be confirmed if the first and second catalysts are both sufficiently regenerated. For example, it may be determined if the first and second catalysts are both regenerated by at least a threshold amount, and/or a difference between their regeneration states is less than a threshold amount. In one example, both the first and second catalyst may be fully regenerated. When the first and second catalysts are both sufficiently regenerated, at 520, the routine includes selecting a group of cylinders based on the deactivation order. That is, selecting the group of cylinders that was not previously deactivated (that is, was not deactivated on the immediately previous deactivation cycle). By alternating the group of cylinders that is selected over consecutive deactivation cycles, catalyst and engine wear may be balanced. For example, if the first group of cylinders was selectively deactivated on the immediately preceding deactivation cycle, the second group of cylinders may be selectively deactivated on a following (e.g., the next) deactivation cycle. Likewise, if the second group of cylinders was selectively deactivated on a first deactivation cycle, the first group of cylinders may be selectively deactivated on the immediately following deactivation cycle.

In this way, the regeneration state of the catalyst may be used to override a default deactivation order based selection of cylinders during a VDE mode of operation. By selecting the group of cylinders with the partially regenerated catalyst for deactivation, fuel that may have otherwise been used to complete regeneration of that catalyst may be saved. Thus, fuel economy may be improved.

In another embodiment, the selection may be further based on a temperature of the first catalyst relative to the second catalyst. For example, to maintain an emission control device at a desired temperature (or within a desired temperature range) during the VDE mode of engine operation, the selection may be further adjusted based on the regeneration state and the temperature of the catalyst, giving priority to the temperature. Herein, returning to 506, if the first catalyst is less regenerated than the second catalyst, it may be further confirmed if the temperature of the first catalyst is lower than the temperature of the second catalyst at 512. Alternatively, it may be determined if the first catalyst temperature is lower than a threshold temperature, such as a temperature below which the efficiency of the first catalyst drops below a desired level. The temperature of the first and second catalysts may be determined by first and second temperature sensors coupled to the respective catalysts. If the first catalyst has a lower temperature and a lower regeneration state, then the first cylinder group may be selected at 514. However, when the temperature of the second catalyst is lower than the temperature of the first catalyst, even if the first catalyst is less regenerated than the second catalyst, the second group of cylinders may be selected for deactivation. Likewise, returning to 508, if the second catalyst is less regenerated than the first catalyst, it may be further confirmed if the temperature of the second catalyst is lower than the temperature of the first catalyst at 518. Alternatively, it may be determined if the second catalyst temperature is lower than a threshold temperature, such as a temperature below which the efficiency of the second catalyst drops below a desired level. If the second catalyst has a lower temperature and a lower regeneration state, then the second cylinder group may be selected at 516. However, when the temperature of the first catalyst is lower than the temperature of the second catalyst, even if the second catalyst is less regenerated than the first catalyst, the first group of cylinders may be selected for deactivation at 514.

In this way, by selecting a group of cylinders based on a regeneration state of the catalyst during some conditions and further based on a catalyst temperature during other conditions, exhaust conditions of an emission control device coupled to a deactivated cylinder group may be maintained and fuel wastage may be reduced.

In one example, the regeneration state and/or temperature based override of the default (deactivation order based) cylinder group selection may be enabled for a threshold number of cycles, after which the selection may resume the deactivation order basis to balance catalyst usage. In other words, the first group of cylinders may be selected for deactivation for a threshold number of consecutive deactivation cycles where the first catalyst is less regenerated than the second catalyst. After the threshold number of consecutive deactivation cycles, the second group of cylinders may be selected even if the first catalyst is (still) less regenerated than the second catalyst. Likewise, the second group of cylinders may be selected for deactivation for a threshold number of consecutive deactivation cycles where the second catalyst is less regenerated than the first catalyst. After the threshold number of consecutive deactivation cycles, the first group of cylinders may be selected even if the second catalyst is (still) less regenerated than the first catalyst In one example, an engine controller may selectively deactivate a first group of cylinders on a first deactivation cycle (that is, first VDE cycle). On the next deactivation cycle, during a first mode (or first condition), the controller may selectively deactivate a second group of cylinders while during a second mode (or second condition), the controller may selectively deactivate the first group of cylinders again. Deactivating the first group of cylinders may include selectively disabling (one or more) fuel injectors while continuing valve operation of the first group of cylinders Likewise, deactivating the second group of cylinders may include selectively disabling (one or more) fuel injectors while continuing valve operation of the second group of cylinders. The first mode may include each of a first exhaust catalyst, coupled downstream of the first group of cylinders, and a second exhaust catalyst, coupled downstream of the second group of cylinders, being sufficiently regenerated and/or a difference between their regeneration states being less than a threshold. In comparison, the second mode may include the first catalyst being less regenerated than the second catalyst by more than a threshold amount. In another example, the first mode may include a temperature of the second catalyst being lower than the first catalyst and the first catalyst being less regenerated than the second catalyst, while the second mode includes a temperature of the first catalyst being lower than the second catalyst and the second catalyst being less regenerated than the first catalyst. In this way, the conditions of an exhaust catalyst coupled to a deactivated cylinder group may be maintained to keep the catalyst operation ready during an eventual cylinder group reactivation.

It will be further appreciated that if a deceleration fuel shut-off (DFSO) is requested while in the VDE mode of engine operation, the engine controller may directly transition the engine from the VDE mode to the DFSO mode without performing an interim catalyst regeneration to further reduce fuel wastage.

During selected conditions, when regeneration of a catalyst is required, the catalyst may be regenerated using a two-stage regeneration process. As such, regeneration may be needed to reduce the oxygen content of the catalyst so that catalyst sites are available for NOx conversion. The catalyst regeneration may include, for example, a first enrichment for a first duration immediately followed by a second enrichment for a second duration. The first enrichment may have a higher degree of richness as compared to the second enrichment, and the first duration may be shorter than the second duration. The switch point from the very rich enrichment to the slightly rich enrichment may be based on an estimated total oxygen storage capacity of the catalyst. As such, if the rich stage is too short, regeneration times may be prolonged. However, if the rich stage is too long, unburned hydrocarbons may breakthrough, degrading exhaust emissions. Since the enrichment that can be tolerated before exhaust breakthrough will vary based on operating conditions and catalyst oxygen storage capacity, the engine control system may use an adaptive storage model to predict a total amount of fuel that can be used for the regeneration, as well as to trigger the switch between the regeneration stages at a switch point where the regeneration is adequate and the risk of breakthrough is low. Since the oxygen storage capacity varies with catalyst temperature and age, the adaptive model may assume a nominal variation with catalyst temperature and learn the adaptive correction during regeneration based on the amount of fuel required. The learned values may also be used to diagnose the catalyst during diagnostic routines.

Now turning to FIG. 6, an example routine 600 is described for adjusting each of a first shut-off valve, coupled between a first cylinder group and a first downstream catalyst, and a second shut-off valve, coupled between a second cylinder group and a second downstream catalyst, based on the selective deactivation of either the first cylinder group or the second cylinder group. Specifically, based on the selection, the shut-off valve coupled between the selected cylinder group and the downstream catalyst may be closed while the shut-off valve coupled to the enabled cylinder group is adjusted to provide an amount of EGR. Additionally, an EGR valve coupled to the enabled cylinder group may be adjusted. As such, the routine of FIG. 6 may be executed when the engine is operated in the VDE mode. By adjusting the various shut-off valves and EGR valves, VDE operations and EGR operations may be coordinated while maintaining catalyst conditions.

At 602, it may be confirmed that the engine is operating in the VDE mode. Upon confirmation, at 604, the routine includes determining which cylinder group has been selected for deactivation. As elaborated in FIG. 5, either the first or the second cylinder group may have been selected for deactivation based on one or more of the regeneration state of a first catalyst (coupled to the first cylinder group) relative to a second catalyst (coupled to the second cylinder group), a temperature of the first catalyst relative to the second catalyst, and a deactivation order of the cylinder groups. When the first group of cylinders is selected, for example, when the first catalyst is only partially regenerated, one or more fuel injectors from the first group of cylinders may be deactivated. When the second group of cylinders is selected, for example, when the second catalyst is only partially regenerated, one or more fuel injectors from the second group of cylinders may be deactivated.

At 606, the routine includes, based on the selection, closing the valve coupled between the selected cylinder group and a downstream catalyst. For example, when the first cylinder group is selected, the routine includes closing a first shut-off valve coupled between the first cylinder group and a first downstream catalyst. As another example, when the second cylinder group is selected, the routine includes closing a second shut-off valve coupled between the second cylinder group and a second downstream catalyst.

At 608, the routine includes opening an EGR valve in the EGR loop of the enabled cylinder group based on a desired amount of EGR. In one example, the EGR valve of the enabled cylinder group may be fully opened. In another example, the opening of the EGR valve may be increased to increase an amount of EGR provided to the enabled cylinder group. At 610, the routine includes, adjusting the shut-off valve coupled to the enabled cylinder group to adjust the amount of exhaust gas that is recirculated through the EGR loop of the enabled cylinder group.

For example, when the first cylinder group is not selected for deactivation, the routine includes adjusting the first shut-off valve to adjust a first amount of exhaust gas that is recirculated via a first EGR loop of the first cylinder group. In one example, the first valve may be adjusted while a first EGR valve in the first EGR loop is fully opened. The first EGR loop may be coupled upstream of the first shut-off valve and may be configured to recirculate at least some exhaust gas to an intake of the first group of cylinders. The first amount of EGR may be based on engine operating conditions, such as, a number of deactivated fuel injectors in the second group of cylinders. As another example, when the second cylinder group is not selected for deactivation, the routine includes adjusting the second shut-off valve to adjust a second amount of exhaust gas that is recirculated via a second EGR loop of the second cylinder group. The second valve may be adjusted while a second EGR valve in the second EGR loop is fully opened. The second EGR loop may be coupled upstream of the second shut-off valve and may be configured to recirculate at least some exhaust gas to an intake of the second group of cylinders. The second amount of EGR may be based on engine operating conditions, such as, a number of deactivated fuel injectors in the first group of cylinders.

Each of the first and second EGR valves, and the first and second shut-off valves may also be adjusted based on EGR transients and torque disturbances anticipated during a transition of the engine in to and/or out of the VDE mode. Thus, as the first cylinder group is deactivated and/or reactivated, each of the second shut-off valve and the second EGR valve may be adjusted to compensate for disturbances in the second cylinder group. For example, a first amount of EGR provided to the first cylinder group may be adjusted based on the whether the second group of cylinders is being deactivated or reactivated. Likewise, when the second cylinder group is deactivated and/or reactivated, the first EGR valve and the first shut-off valve may be adjusted to compensate for disturbances in the first cylinder group. For example, the second amount of EGR provided to the second cylinder group may be adjusted based on the whether the first group of cylinders are being deactivated or reactivated.

In addition to valve adjustments, one or more other engine operating parameters, such as an amount of boost, spark timing, etc., may also be adjusted to compensate for EGR and torque transients. Similarly, one or more air intake throttles and backflow throttle valves may be adjusted in coordination with the EGR valves and/or shut-off valves to compensate for torque disturbances. In one example, a first air intake throttle may be coupled to the first group of cylinders while a second intake throttle is coupled to the second group of cylinders, in a parallel air intake system (as shown in FIGS. 2B-C). The engine controller may be configured to adjust the first intake throttle when transitioning the one or more fuel injectors of the second group of cylinders through the deactivation, and adjust the second intake throttle when transitioning the one or more fuel injectors of the first group of cylinders through the deactivation. The air intake throttles may be adjusted differently when transitioning through the deactivation as compared to when transitioning through a reactivation of the disabled cylinders.

As an example, during a first condition, when the first catalyst is less regenerated than the second catalyst, the first cylinder group and not the second cylinder group may be deactivated. During a second condition, when the second catalyst is less regenerated than the first catalyst, the second cylinder group and not the first cylinder group may be deactivated. During the first condition, the first shut-off valve may be closed while the second shut-off valve is adjusted to adjust an amount of EGR provided to the second group of cylinders via a second EGR loop including a second EGR valve. In the same way, during the second condition, the second shut-off valve may be closed while the first shut-off valve is adjusted to adjust an amount of EGR provided to the first group of cylinders via a first EGR loop including a first EGR valve. During the first condition, the second EGR valve may be fully open while during the second condition, the first EGR valve may be fully open.

Further, during the first condition, as the first cylinder is deactivated (that is, transitioned in to the VDE mode), an opening of the second shut-off valve may be increased to increase the amount of EGR provided to the second cylinder group during the transition. In the same way, during the second condition, as the second cylinder is deactivated (that is, transitioned in to the VDE mode), an opening of the first shut-off valve may be increased to increase the amount of EGR provided to the first cylinder group during the transition. In an alternate example, when the first cylinder is deactivated (that is, transitioned out of the VDE mode), an opening of the second shut-off valve may be decreased to decrease the amount of EGR provided to the second cylinder group during the transition, while during the second condition, as the second cylinder is deactivated (that is, transitioned out of the VDE mode), an opening of the first shut-off valve may be decreased to decrease the amount of EGR provided to the first cylinder group during the transition.

In this way, by adjusting and coordinating the operation of one or more valves coupled to the groups of cylinders based the selective deactivation of the cylinders, VDE and EGR operations may be coordinated and the engine may be better transitioned between VDE and non-VDE modes. By using the same set of valves to maintain catalyst conditions as well as to adjust EGR amounts, component reduction benefits may also be achieved.

Now turning to FIG. 7, an example routine 700 is described for adjusting each of a first backflow throttle, coupled upstream of a first turbocharger compressor in a first intake passage leading to a first cylinder group, and a second backflow throttle, coupled upstream of a second turbocharger compressor in a second, parallel intake passage leading to a second cylinder group (such as backflow throttles 320 and 322 of FIG. 2C). Specifically, following selection of a cylinder group for deactivation, the first and second throttles may be adjusted based on the deactivation to reduce back-flow of boosted air through the disabled group of cylinders. In this way, loss of boosting efficiency due to back-flow may be reduced. As such, the routine of FIG. 7 may be executed when the engine is operated in the VDE mode.

At 702, it may be confirmed that the engine is operating in the VDE mode. Upon confirmation, at 704, the routine includes determining which cylinder group has been selected for deactivation. As elaborated in FIG. 5, a controller may select either the first or the second group of cylinders for deactivation based at least on a regeneration state of the first catalyst coupled downstream of the first group of cylinders relative to the second catalyst coupled downstream of the second group of cylinders.

At 706 and 708, the routine includes, based on the selection, adjusting the first backflow throttle coupled upstream of the first compressor in the first intake passage of the first group of cylinders, and the second backflow throttle coupled upstream of the second compressor in the second intake passage of the second group of cylinders. Specifically, when the first group of cylinders is selected for deactivation, the routine includes closing the first backflow throttle valve and at least partially opening the second backflow throttle valve. The opening of the second throttle may be based on a number of deactivated cylinders in the first cylinder group. The opening of the second throttle may also be adjusted based on a desired boost level, and based on an amount of exhaust gas to be recirculated to the second group of cylinders. For example, as the amount of exhaust gas to be recirculated increases, an opening of the second throttle may be increased.

The opening of the second throttle may be further adjusted based on whether the first group of cylinders is transitioning in to or out of the deactivation. For example, the opening of the second throttle may be increased as the first group of cylinders transition in to the deactivation, while the opening of the second throttle may be decreased as the first group of cylinders transition out of the deactivation.

In the same way, when the second group of cylinders is selected for deactivation, the routine includes closing the second throttle and at least partially opening the first based on a number of deactivated cylinders in the second cylinder group, a desired boost level, and a desired amount of EGR to be recirculated to the first cylinder group. By closing the throttle coupled to the cylinder group selected for deactivation, backflow issues can be reduced, thereby reducing boost losses. By adjusting the backflow throttle coupled to the enabled cylinder group, the desired boost may be provided while compensating for torque disturbances.

At 710, the controller may adjust the position of a third throttle (such an intake throttle 158 of FIG. 2C) positioned downstream of the first and second compressors based on the deactivation to assist in providing the desired boost and desired amount of EGR. For example, when the first cylinder group is selected for deactivation, the controller may at least partially opening the third throttle based on the number of deactivated cylinders in the first cylinder group and the opening of the second throttle.

In addition to throttle adjustments, other operating parameters may be adjusted during the transition in to or out of the VDE mode of operation. For example, the controller may retard spark ignition timing by a first amount as the first group of cylinders transitions in to the deactivation, and retard spark ignition timing by a second, different amount as the first group of cylinders transition out of the deactivation.

While the routine of FIG. 7 describes throttle adjustments for backflow throttle valves coupled upstream of respective compressors, in an alternate embodiment, throttle adjustments may be made for backflow throttle valves coupled downstream of respective compressors (such as backflow throttles 320 and 322 of FIG. 2B). For example, the controller may deactivate the first cylinder group (in response to the first catalyst being less regenerated than the second catalyst), following which the controller may adjust each of the first backflow throttle (positioned downstream of the first turbocharger compressor in the first intake passage leading to the first cylinder group) and the second backflow throttle valve (positioned downstream of the second turbocharger compressor in the second intake passage leading to the second cylinder group) responsive to the deactivation. As an example, the controller may fully close the first downstream backflow throttle valve while adjusting an opening of the second downstream backflow throttle valve based on the number of deactivated cylinders in the first cylinder group, and further based on a desired amount of boost. The controller may further adjust a third throttle positioned upstream of the first and second compressors (such as IAS throttle 230 in FIG. 2B) responsive to the deactivation, and further based on the opening of the second backflow throttle valve and the desired amount of boost. The opening of the second backflow throttle valve may also be adjusted during the transition into the VDE mode. Thus, as the first cylinder group is transitioned to a deactivated state, an opening of the second backflow throttle valve may be increased, while decreasing an opening of the second backflow throttle valve as the first cylinder group is reactivated.

In still another embodiment, wherein the engine system includes backflow valves in place of backflow throttles (such as backflow valves 310 and 312 of FIG. 2A), the controller may adjust the position of the valves based on the deactivation. For example, upon deactivating the first group of cylinders, the controller may close (e.g., fully close) a first backflow valve coupled downstream of the first compressor in the first intake passage coupled to the first group of cylinders. By closing the backflow valve coupled to the disabled group of cylinders, backflow may be reduced. Concurrently, the controller may adjust a position of a second backflow valve coupled downstream of the second compressor in the second intake passage coupled to the second group of cylinders, as well as a throttle valve (e.g., throttle 158 of FIG. 2A) coupled downstream of the first and second valves. By adjusting the second backflow valve and the throttle valve, while operating the second compressor, a desired amount of boost may be provided to the enabled second group of cylinders. The controller may further adjust the position of the second valve and the throttle valve based on a number of deactivated cylinders in the first group of cylinders, and a first amount of EGR provided to the first group of cylinders via a first EGR loop. By adjusting the positions of the valves and throttles based on the EGR amount, EGR transients generated during VDE transitions may be reduced, improving engine performance. Also, VDE operations may be coordinated with EGR operations.

While the routines of FIGS. 6-7 illustrate adjusting various valves and throttles during the VDE transitions, it will be appreciated that in still further embodiments, the controller may adjust one or more transmission components during the transition. For example, the controller may allow a transmission converter clutch to slip during the transition into the VDE and/or during the VDE mode of operation. This allows some of the undesirable torque pulses to be absorbed by the converter, reducing NVH issues experienced by the driver.

It will be appreciated that in addition to adjusting the various valves and throttles during the VDE transitions, the controller may further adjust the VDE transitions according to a performance based schedule that is based on the vehicle operator's driving habits. The driving habits may be learned with respect to, for example, a pedal input, and, if available, a user selectable mode switch (e.g., a switch with positions for varying degrees of performance mode and fuel economy mode). In one example, for a driver with a "busy foot" (e.g., a more aggressive driver), while in VDE mode of operation, an exit from the VDE mode may be made more difficult, to prevent frequent entry/exit events that may decrease the overall fuel economy. As another example, for the driver with the "busy foot", while in a non-VDE mode of operation, an entry into the VDE mode may be made more difficult, to prevent frequent entry/exit events that may decrease the overall fuel economy. In this way, by adjusting the transitions based on operator driving habits, further fuel economy benefits can be achieved.

Figure 8:
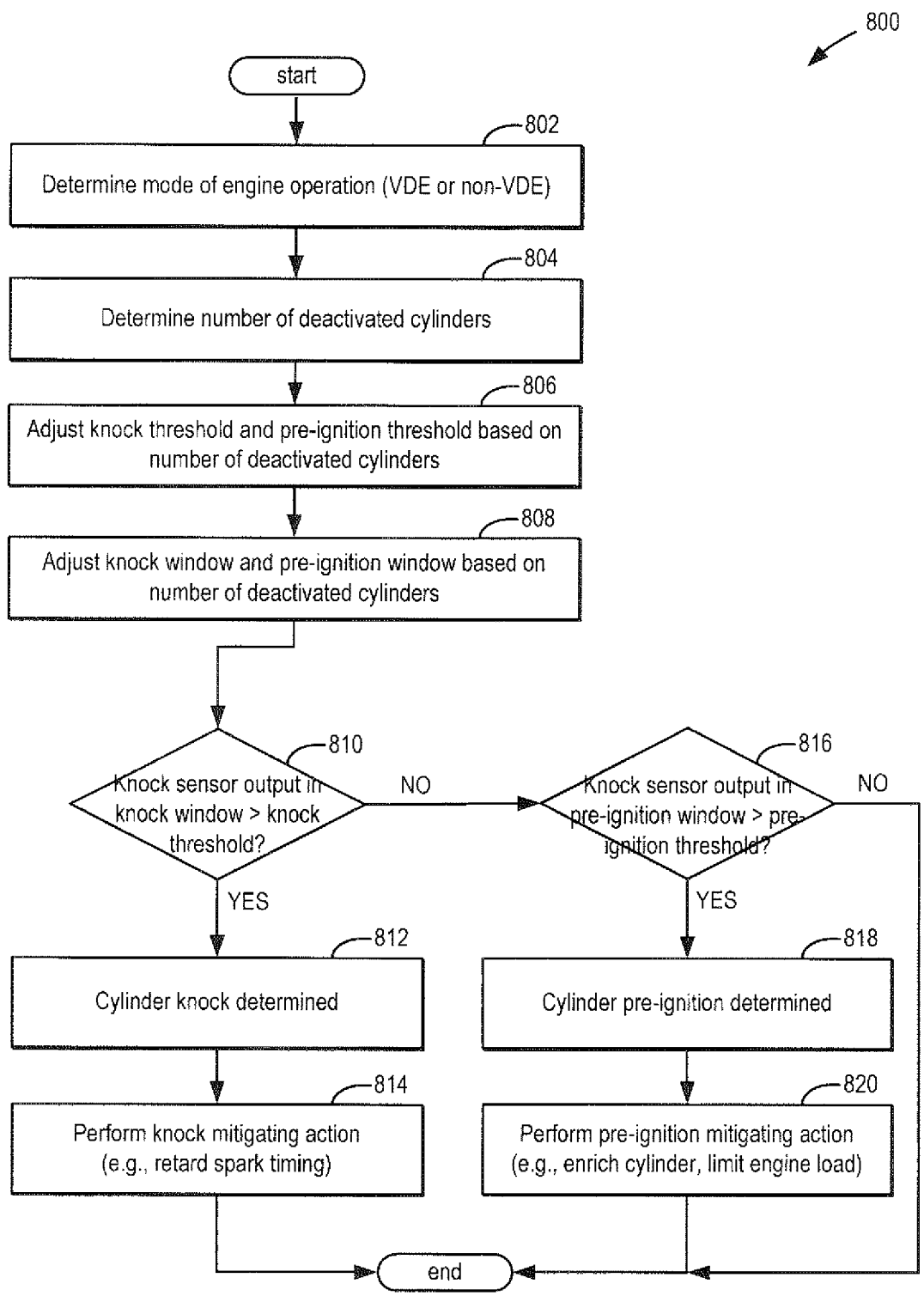
FIG. 8 shows a high level flow chart for detecting and differentiating pre-ignition and/or knock.

Now turning to FIG. 8, an example routine 800 for detecting and differentiating abnormal combustion events in a variable displacement engine system is described. By adjusting knock and pre-ignition detection windows and thresholds based on the deactivation, incorrect identification of regular combustion events as abnormal combustion events, in particular in a boosted VDE engine during a VDE mode of operation, may be reduced.

At 802, the routine includes determining the mode of engine operation (that is, VDE or non-VDE mode). At 804, a number of deactivated cylinders in the selected group of cylinders may be determined. At 806, the routine includes adjusting a threshold for each of knock detection and pre-ignition detection based on the number of deactivated cylinders. At 808, the routine includes adjusting a window for each of knock detection and pre-ignition detection based on the number of deactivated cylinders. The window for pre-ignition and the window for knock may both be crank angle windows.

As such, the engine controller may be configured to detect and differentiate abnormal combustion events due to cylinder knocking from those indicative of cylinder pre-ignition based on the output (e.g., signal timing, amplitude, intensity, frequency, etc.) of the one or more knock sensors 82 (FIG. 1) distributed along the engine block. By using distinct thresholds and windows for knock and pre-ignition detection, knocking may be better differentiated from pre-ignition. Since knocking and pre-ignition require distinct mitigating actions, by improving their detection and differentiation, their mitigation can also be improved. Specifically, since pre-ignition is mitigated with fuel injection adjustments while knock is mitigated with spark timing adjustments, by improving the detection of cylinder knock and/or pre-ignition, fuel economy may be improved. In one example, a cylinder pre-ignition event may be determined based on the output of the one or more knock sensors estimated in a first, earlier window being larger than a first, higher threshold, while a cylinder knock event may be determined based on the output of the one or more knock sensors estimated in a second, later window being larger than a second, lower threshold.

The adjustments at 806 and 808 may include, for example, increasing the threshold for each of knock and pre-ignition as the number of deactivated cylinders increases. Likewise, the window for each of knock and pre-ignition may be increased, or widened, as the number of deactivated cylinders increases. In other words, when a larger number of cylinders are deactivated, the knock and pre-ignition windows may cover a larger crank angle window, while when a smaller number of cylinders are deactivated, the knock and pre-ignition windows may cover a smaller crank angle window. In one example, where the window for knock detection and the window for pre-ignition detection are partially overlapping, the adjustment may include increasing an amount of overlap between the knock and pre-ignition detection windows as the number of deactivated cylinders increases.

As such, when more cylinders are deactivated, the average background noise level of cylinder combustion events may be lower. Since the engine control system uses the average background noise level as a reference for determining the threshold against which abnormal combustion events are identified, the lower average noise level during cylinder deactivation can artificially increase the number of cylinder combustion events identified as knocking or pre-ignition events. The subsequent mitigating actions may reduce fuel economy, engine output, and engine efficiency. Thus, by increasing the threshold when fewer cylinders are enabled, a larger difference between the background noise level and the output of the knock sensors may be required for a combustion event to be considered an abnormal combustion event. In the same way, by using a wider detection window, a timing of the abnormal combustion event may be better correlated with engine operating conditions, thereby enabling knock to be better differentiated from pre-ignition.

In one example, an engine controller may have different knock detection and pre-ignition detection windows and thresholds for the different modes of operation stored in a look-up table in the controller's memory. These may include a first threshold and first window for knock detection when the engine is in the non-VDE mode (with all cylinders firing), a second threshold and second window for knock detection when the engine is in the VDE mode with a smaller number of deactivated cylinders, and a third threshold and third window for knock detection when the engine is in the VDE mode with a larger number of deactivated cylinders. Similarly, a set of windows and thresholds for pre-ignition detection may be predetermined and stored for the non-VDE mode, and for a VDE mode with different numbers of deactivated cylinders.

In addition to storing data pertaining to knock and pre-ignition, the controller may also store data (e.g., acceleration profiles, signal content, etc.) pertaining to cylinder misfires. These may be learned on a per-cylinder basis and used to correct for engine speed profiles irregularities, to improve noise signal quality, and improve noise detection capabilities.

Following the adjustments to the knock and pre-ignition detection windows and thresholds, at 810, it may be determined if the output of the one or more knock sensors in the knock detection window is greater than the knock detection threshold. If yes, then at 812, cylinder knock may be determined. Accordingly, at 814, a knock mitigating action may be performed. For example, spark timing may be retarded in the affected cylinder, or group of cylinders. If no knock is determined at 810, then at 816, it may be determined if the output of the one or more knock sensors in the pre-ignition detection window is greater than the pre-ignition detection threshold. If yes, then at 818, cylinder pre-ignition may be determined. Accordingly, at 820, a pre-ignition mitigating action may be performed. For example, the affected cylinder, or group of cylinders, may be enriched, or enleaned, for a duration. Additionally, or optionally, the affected group of cylinders may be load limited.

In one example, a boosted variable displacement engine may include a first knock sensor coupled to the first group of cylinders (or first bank) and a second knock sensor coupled to the second group of cylinders (or second bank). The engine controller may estimate the output of the knock sensors relative to a first knock threshold in a first knock window and relative to a second pre-ignition threshold in a second pre-ignition window. Cylinder knock and/or pre-ignition may be determined based on the estimation. The first and second windows and the first and second thresholds may be adjusted based on the group of cylinders selected for deactivation. As an example, when the first group of cylinders is selected for deactivation, the first and second thresholds may be adjusted based on an output of the second knock sensor but not the first knock sensor. Likewise, when the second group of cylinders is selected for deactivation, the first and second thresholds may be adjusted based on an output of the first knock sensor but not the second knock sensor. In other words, only the output of the knock sensor coupled to the enabled group of cylinders may be used to adjust the knock and pre-ignition thresholds, while the output of the knock sensor coupled to the disabled group of cylinders may be disregarded. As another example, the first and second thresholds may be adjusted based on an average output of the first and second knock sensor when neither group of cylinders are deactivated (that is, based on the output of the knock sensors when the engine is in the non-VDE mode only). In this way, by adjusting the threshold, or reference noise levels, against which abnormal combustion events are identified based on the deactivation, the erroneous identification of combustion events as cylinder knock or pre-ignition combustion events may be reduced. As such, this allows engine degradation to be reduced and fuel economy to be improved.

In this way, by adjusting the operation of a variable displacement engine, fuel economy can be improved. By selecting the group of cylinders that is coupled to the less regenerated catalyst, even if the same group of cylinders was selected in the immediately previous VDE cycle, fuel wastage due to catalyst regeneration on a disabled cylinder group can be reduced. In this way, fuel economy may be improved without substantially affecting engine or catalyst wear.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, 1-4, 1-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operating an engine, comprising:
   determining relative regeneration states of a first and second catalyst respectively coupled to a first group of cylinders and a second group of cylinders; and
   selecting either the first group or the second group of cylinders for deactivation based on whether the first and second catalysts are both regenerated by at least a first threshold, and a difference between their regeneration states is less than a second threshold.

2. The method of claim 1, wherein the regeneration state of the first catalyst is estimated based on an air-to-fuel ratio differential across the first catalyst, and wherein the regeneration state of the second catalyst is estimated based on an air-to-fuel ratio differential across the second catalyst, wherein the deactivation includes turning off fuel injectors and continuing to open or close intake and exhaust valves to pump air through the selected group of cylinders.

3. The method of claim 1 wherein the selection overrides a default deactivation order based selection of cylinders.

4. The method of claim 1 wherein the selection includes selecting cylinders based on a deactivation order when both catalysts are regenerated by at least the first threshold, and the difference between their regeneration states is less than the second threshold.

5. The method of claim 1, wherein the selecting includes, selecting the first group of cylinders to be deactivated when the first catalyst is less regenerated than the second catalyst.

6. The method of claim 5, wherein the selecting further includes, selecting the first group of cylinders to be deactivated when the first catalyst is less regenerated than the second catalyst by at least a threshold amount.

7. The method of claim 5, wherein the selecting further includes, selecting the first group of cylinders for deactivation for a threshold number of consecutive deactivation cycles where the first catalyst is less regenerated than the second catalyst; and
   after the threshold number of consecutive deactivation cycles, selecting the second group of cylinders for deactivation even if the first catalyst is less regenerated than the second catalyst.

8. The method of claim 5, wherein the selecting further includes, selecting the second group of cylinders to be deactivated when the second catalyst is less regenerated than the first catalyst.

9. The method of claim 8, wherein the selecting further includes, selecting the second group of cylinders to be deactivated when the second catalyst is less regenerated than the first catalyst by at least a threshold amount.

10. The method of claim 8, wherein the selecting further includes, selecting the second group of cylinders for deactivation for a threshold number of consecutive deactivation cycles where the second catalyst is less regenerated than the first catalyst; and
    after the threshold number of consecutive deactivation cycles, selecting the first group of cylinders even if the second catalyst is less regenerated than the first catalyst.

11. The method of claim 8, wherein the selecting further includes, selecting a group of cylinders that was not previously deactivated when the first and second catalysts are both regenerated by at least the first threshold amount.

12. The method of claim 8, wherein the selecting is further based on a temperature of the first catalyst relative to the second catalyst.

13. The method of claim 12, wherein the selecting based on the temperature includes,
    selecting the first group of cylinders to be deactivated when the temperature of the first catalyst is lower than a temperature of the second catalyst, even if the second catalyst is less regenerated than the first catalyst; and
    selecting the second group of cylinders to be deactivated when the temperature of the second catalyst is lower than the temperature of the first catalyst, even if the first catalyst is less regenerated than the second catalyst.

14. A method of operating an engine including a first group of cylinders coupled to a first catalyst and a second group of cylinders coupled to a second catalyst, comprising,
    selectively deactivating the first group of cylinders on a first deactivation cycle; and
    on a following deactivation cycle;

during a first mode including a temperature of the second catalyst being lower than the first catalyst and the first catalyst being less regenerated than the second catalyst, selectively deactivating the second group of cylinders, and during a second mode including a temperature of the first catalyst being lower than the second catalyst and the second catalyst being less regenerated than the first catalyst, selectively deactivating the first group of cylinders.

15. The method of claim 14, wherein the first mode includes each of the first catalyst and the second catalyst being regenerated by a threshold amount.

16. The method of claim 14, wherein deactivating the first group of cylinders includes selectively disabling fuel injectors while continuing valve operation of the first group of cylinders, and wherein deactivating the second group of cylinders includes selectively disabling fuel injectors while continuing valve operation of the second group of cylinders.

17. An engine system, comprising:
 a boosted engine;
 a first group of cylinders with selectively deactivatable fuel injectors;
 a second group of cylinders with selectively deactivatable fuel injectors;
 a first catalyst coupled downstream of the first group of cylinders;
 a second catalyst coupled downstream of the second group of cylinders;
 a first set of oxygen sensors for estimating a first air-to-fuel ratio differential across the first catalyst;
 a second set of oxygen sensors for estimating a second air-to-fuel ratio differential across the second catalyst; and
 a control system with non-transitory computer readable instructions for,
  selecting either the first group or the second group of cylinders for deactivation based at least on a regeneration state of the first catalyst relative to the second catalyst, including based on whether the first and second catalysts are both regenerated by at least a first threshold, and a difference between their regeneration states is less than a second threshold, the selecting further including selecting cylinders based on a deactivation order when both catalysts are regenerated by the first threshold, and the difference between their regeneration states is less than the second threshold.

18. The system of claim 17 further comprising a first temperature sensor coupled to the first catalyst and a second temperature sensor coupled to the second catalyst, wherein the selecting is further based on a temperature of the first catalyst relative to the second catalyst.

19. The system of claim 18, wherein the regeneration state of the first catalyst is based on the first air-to-fuel ratio differential and the regeneration state of the second catalyst is based on the second air-to-fuel ratio differential.

20. The system of claim 19, wherein the selecting includes,
 when the first catalyst is regenerated less than the second catalyst, selecting the first group of cylinders for deactivation;
 when the second catalyst is regenerated less than the first catalyst, selecting the second group of cylinders for deactivation;
 when the difference between regeneration states of the first and second catalysts are less than the second threshold, selecting the first group of cylinders for deactivation if the temperature of the first catalyst is lower than the temperature of the second catalyst, and selecting the second group of cylinders for deactivation if the temperature of the second catalyst is lower than the temperature of the first catalyst.

\* \* \* \* \*